(12) United States Patent
Capella et al.

(10) Patent No.: US 9,781,581 B1
(45) Date of Patent: *Oct. 3, 2017

(54) SYSTEM AND METHOD FOR SENDING MESSAGES

(71) Applicant: Higher Ground LLC, Palo Alto, CA (US)

(72) Inventors: Michael Glenn Capella, Santa Rosa, CA (US); David Daugherty, Jackson, CA (US); Shmuel Shaffer, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,123

(22) Filed: May 25, 2017

Related U.S. Application Data

(63) Continuation-in-part of application No. 15/421,900, filed on Feb. 1, 2017, now Pat. No. 9,712,984.

(51) Int. Cl.
*H04W 4/14* (2009.01)
*H04L 29/12* (2006.01)

(52) U.S. Cl.
CPC .......... *H04W 4/14* (2013.01); *H04L 61/2069* (2013.01)

(58) Field of Classification Search
CPC .............................. H04W 4/14; H04L 61/2069
See application file for complete search history.

(56) References Cited

U.S. PATENT DOCUMENTS

| | | | |
|---|---|---|---|
| 6,771,974 B1 * | 8/2004 | Sim .................. | H04M 1/72552 340/7.21 |
| 2010/0150031 A1 * | 6/2010 | Allen ..................... | H04L 67/14 370/276 |
| 2011/0032847 A1 | 2/2011 | Allen et al. | |

* cited by examiner

*Primary Examiner* — Nizar Sivji
(74) *Attorney, Agent, or Firm* — Panitch Schwarze Belisario & Nadel LLP

(57) ABSTRACT

A system for exchanging messages between a business user and another messaging-capable device, and associated methods are presented. The system may include a business server, an application programming interface ("API") and/or an SMS database. The business server may be configured to exchange messages with the business user and to obtain a public identifier for the business user to enable duplex message exchange between the business user and the messaging-capable device by either retrieving the public identifier or associating the business user with the messaging-capable device and a public identifier. The system may accommodate temporary events, such as emergencies, by associated a public identifier with a business user initiating the temporary event and one or more messaging-capable devices involved in the event.

22 Claims, 18 Drawing Sheets

SYSTEM AND METHOD FOR SENDING MESSAGES

CROSS-REFERENCE TO RELATED APPLICATION

This application is a continuation-in-part of U.S. patent application Ser. No. 15/421,900, filed Feb. 1, 2017, and incorporated by reference herein.

FIELD OF ENDEAVOR

Aspects of the present disclosure relate to systems and techniques that may be used to facilitate exchanging messages between a business message service and messaging-capable devices.

BACKGROUND

Short message service ("SMS"), or "text messaging", is a text-based messaging service that may be used by telephones, computer applications, the world wide web, mobile phones or other mobile or stationary devices. A basic SMS system, typically run by an SMS service provider, is usually a one-to-one communication configuration, e.g., messages exchanged between two mobile phones, or a one-to-many configuration, e.g., messages broadcasted to multiple mobile phones. A recipient of a message also receives metadata of the message, including a sender identifier and a recipient identifier, e.g., the sender's phone number and the recipient's phone number. The recipient of the message is able send a reply message back to the sender using the sender identifier because it may unambiguously identify the sender using the sender identifier of the message.

However, this approach requires a public identifier, i.e., a phone number, for each message sender, which may be cost inefficient. For example, certain business companies have a number of users who use SMS to exchange messages with other SMS service users. Some businesses have developed messaging service that facilitates sending messages from a server. In order to facilitate the users to exchange messages with users of other SMS services, e.g., public SMS services, a business messaging service may have to rent a public identifier for each user of the business messaging service, and have the server of the business messaging service use the public identifier of the user sending the message when sending a message to a message recipient. However, for services with a large number of users, this approach may be cost inefficient or even prohibitively expensive.

In order to reduce costs of such business messaging services, a business operator may rent a limited number of identifiers from an SMS service provider, e.g., a limited number of phone numbers, which may be used as sender identifiers to be included in the metadata of the messages being sent. Because the number of the identifiers is limited, the identifiers may only identify the business server of the business messaging service. If a message recipient responds with a reply message using the sender identifier, the reply message will be directed to the business server as opposed to an actual user that used the business server to send the message, and the server may not be able to identify the user for whom the reply message is intended.

In a practical satellite-based communication system, Higher Ground LLC's SatPaq™ messaging system provides messaging services to users in remote or isolated areas not served by any cellular networks. The SatPaq™ system communicates with SMS systems, e.g., wireless systems, via at least a satellite and a ground station. In the SatPaq™ system, many SatPaq™ users may send messages via the satellite and the ground station to mobile phones and/or computing devices or other messaging-capable devices. The metadata of a message sent by a SatPaq™ user may include the recipient's identifier, or a phone number of a messaging-capable device, such as a mobile phone, and an identifier of the ground station. In order to enable any SatPaq™ users to send messages to users of the SMS systems and to receive reply message from the users of the SMS systems, the SatPaq™ system needs to send each of the messages with a unique identifier of the applicable SatPaq™ user. Hence, the SatPaq™ system may require renting one identifier, e.g., a phone number, from an SMS system for each SatPaq™ user, which may be cost ineffective or even prohibitively expensive.

In order to reduce costs for renting the identifiers, the SatPaq™ system may rent a limited number of identifiers from an SMS system, which may identify the server of the SatPaq™ system. With a recipient's identifier, e.g., a phone number, the message may be transmitted from the user of the SatPaq™ system to the recipient. However, when the recipient sends a reply message intended to the SatPaq™ user, the reply message may not be routed to the intended SatPaq™ user because the recipient server and the ground station of the SatPaq™ system do not, under such circumstances, have sufficient information to identify the specific SatPaq™ user, so the ground station cannot route the message back to the specific SatPaq™ user.

Various other business systems, such as accommodation booking systems and airlines and railway systems may encounter similar issues, in which the system is capable of sending out notifications, but does not provide a means by which to directly respond to the sender of the message. For example, an airline may permit a traveler to receive various types of alerts, e.g., via SMS. This is generally done by a person who works for the airline or is associated with the airline via a central computer/SMS transmission facility of the airline, which is associated with a single public identifier. However, if the traveler wants to follow up on the alert, e.g., with a question, if the traveler simply replies to the message via SMS (i.e., using the public identifier), the traveler's follow-up message goes to the central computer/SMS transmission facility, but the central computer/SMS transmission facility may generally be unable to route the follow-up message to the specific sender of the original message.

In view of the foregoing reasons, it may be desirable to have a system and method for uniquely identifying a sender of a message in a cost efficient manner, e.g. without renting a unique identifier/phone number for each sender, when the sender uses a business-type messaging service.

SUMMARY OF THE DISCLOSURE

Various aspects of the present disclosure may address techniques and mechanisms for a system for exchanging messages between a user of a "business messaging system" (which term will be used herein to refer to messaging systems that may generally provide at least outgoing messaging services from multiple users), a "business user" (which term will be used herein to refer to a user of such a system), and a messaging device (which term will be used herein to refer to mobile or stationary devices that are capable of SMS/text messaging). The system may include a business server configured to exchange messages with the business user and to obtain a public identifier for the business user to enable duplex message exchange between the business user and a respective messaging device selected from the messaging devices. The system may also include an application programming interface ("API"), e.g., a short message service ("SMS") API, communicatively coupled to said business server and configured to interact with an SMS system. The SMS system may be run by a SMS service provider that serves the messaging device. The business server may serve a number of business users using a number of public identifiers, where the number of public identifiers may be smaller than the number of business users.

In use, the business user may send a message to a messaging device via the business server using the services provided by the SMS service provider. The message may be received by the business server, which may associate the business user with an identifier of the messaging device and/or a public identifier (e.g., but not limited to, a telephone number), where either the public identifier or a combination of the public identifier and the identifier of the messaging device may uniquely identify the business user. The message with the public identifier as a sender may be transmitted to the messaging device. The messaging device may send a reply message to the business user using the public identifier.

According to one aspect of the disclosure, the business server may be configured to categorize the public identifiers and/or the associations of the business user, the messaging device and the public identifier into multiple types. The business server may also be configured to automatically switch to using temporary public identifiers when a predetermined number of fixed public identifiers associated with a respective messaging device is reached.

According to a further aspect of the disclosure, the business server may be configured to identify a business user based upon the public identifier or a combination of the public identifier and the messaging device for sending a reply message to the business user. The business server may be further configured to access a business user directory and/or a database for allowing messages to be sent to business users included in the directory under certain circumstances.

According to a further aspect of the disclosure, the business server may be configured to dissolve associations of a messaging device and to reclaim the public identifiers contained in the associations for another business user to exchange messages with the respective messaging device according to certain criteria. The business server may be further configured to maintain a list of public identifiers for associating with each intended messaging device.

According to yet a further aspect of the disclosure, a public identifier may be associated with a temporary event, such as an emergency, and used to exchange messages among responders and a business user, such as a lost hiker, accident victim, etc., for the duration of the event. After the event, the association may be dissolved, and the public identifier may be reclaimed for further use.

Various aspects of the disclosure may be embodied in the form of hardware, software, firmware, and/or combinations thereof. In the case of software or firmware, a non-transitory machine-readable medium, such as memory (e.g., but not limited to, ROM, RAM, flash, disk, etc.), may be used to store data and/or executable instructions that may be executed by one or more processing devices.

BRIEF DESCRIPTION OF ACCOMPANYING DRAWINGS

Various aspects of this disclosure will now be discussed in further detail in conjunction with the attached drawings, in which.

Figure 1:
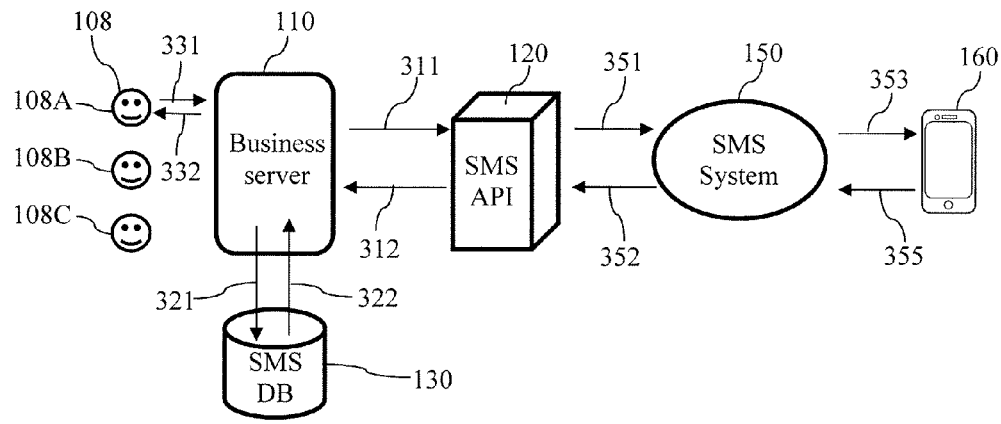
FIG. 1 shows a conceptual diagram of a system for exchanging messages between a short message service ("SMS") user and a messaging device user according to an aspect of this disclosure.

It should be noted that the figures are not drawn to scale and that elements of familiar structures or functions are generally represented by like reference numerals for illustrative purpose throughout the figures. It also should be noted that the figures are only intended to facilitate the description of the various aspects of this disclosure, and therefore, do not illustrate every aspect of this disclosure and do not limit the scope of this disclosure.

DETAILED DESCRIPTION OF ASPECTS OF THE DISCLOSURE

In currently available business messaging systems, a business user may be able to send a message to an intended messaging device, e.g., a cellphone. Such systems, however, may not provide a desired degree of service, e.g., because a reply message sent by a recipient of the message, i.e., a user of the messaging device, may not be routed to the intended business user and, therefore, may not be able to give feedback to the business user or even acknowledge a safe receipt of the message. Because currently-available business messaging systems may lack the ability to route a reply message to the intended business user, a system and method enabling duplex message exchange between the business messaging systems and messaging devices may advantageously provide a basis for enabling duplex communication for exchanging messages between the business users of the business messaging systems and users of SMS services without requiring an individual public identifier for each respective business user. This result may be achieved, according to one aspect of this disclosure, by an example messaging system 100 illustrated in FIG. 1.

Turning to FIG. 1, the messaging system 100 may enable one of multiple business users 108 to exchange messages with a user of one of multiple messaging devices 160, when a limited number of public identifiers are available at a business server 110. The number of the public identifiers may be smaller than the number of the business users 108 that are served by the business server 110. In FIG. 1, the messaging device 160 (or a handheld computing device) may be a cellphone, a tablet computer, a personal digital assistant (PDA), a computer or any other wireless or wired devices that may receive text messages via a wired or wireless communication connection. For purposes of illustration only, exchanging messages between a business user 108 and a user of a messaging device 160 may refer to exchanging message between the business user 108, via a device (not shown), and a user of the messaging device 160. The business user 108 may be a user of the device that may exchange messages with the business server 110, including, but not limited to, a satellite device, a cellphone, a tablet computing device, a computer and the like.

The messaging system 100 may include the business server 110. The business server 110 (or business messaging server) may be a business short messaging service ("SMS") platform including an SMS service for exchanging text messages. The business server 110 may be a single server or a cluster of servers, operated on premise and/or off premise, or be a cloud computing server and the like. Additionally, the business server 110 may exchange messages, via an, an API, e.g., an SMS API 120, with one or more messaging systems or SMS service providers, e.g., an SMS system 150, that may be accessed by the messaging device 160, computers and/or other messaging-capable devices (not shown). The business server 110 may serve a plurality of business users 108, e.g., a user A 108A, a user B 108B and a user C 108C. Each of the plurality of business users 108 may be identified by an internal identifier by the business server 110, e.g., user A 108A may have an identifier 111111, user B 108B may have an identifier 222222, and user C 108C may have an identifier 333333. The internal identifier may not be identifiable by systems other than the business server 110 except when the internal identifier is an assigned public identifier. Additional detail regarding the SMS API 120 and the assigned public identifier will be provided with reference to FIG. 6.

The business server 110 may maintain a user directory and/or a database including all of the business users 108 that are served by the business server 110. The users 108 included in the directory may be assigned with various privileges and/or preferences for receiving different services, e.g., user A 108A may have a privilege of sending and receiving any messages; user B 108B may have a preference of not receiving unsolicited messages; and user C 108C may have a privilege of being assigned a dedicated public identifier. Additional detail regarding the dedicated public identifier will be provided herein.

For purposes of this disclosure, a direct message may be a message sent from a business user 108 and intended for a user of a messaging device 160, and a reply message may be a message sent from the messaging device 160 to the business user 108. When sending a direct message from a business user 108 to a user of a messaging device 160, the business user A 108A may transmit the direct message to the business server 110, at 331. The direct message may include metadata and message text. The metadata of the direct message may include sender identification information and recipient identification information. The sender identification information of the metadata received by the business server 110 may include the internal identifier of the business user 108 (or the device used by the business user 108). The internal identifier, as set forth herein, may be identifiable by the business server 110, but may not be identifiable by other systems, e.g., the SMS system 150, except where the internal identifier is an obtained public identifier. The recipient identification information of the metadata may include an identifier of the messaging device 160 which may be identifiable by the SMS system 150.

The business server 110 may interact with an SMS database ("DB") 130 for obtaining a public identifier that may be used to send the direct message. The SMS DB 130 may be a DB or a database management system ("DBMS"), or alternatively, a directory, a directory service or any type of data repository, for storing a collection of data in an organized manner. The SMS DB 130 may be used to store, e.g., a list of business users 108, a list of public identifiers available to the business users 108, associations of the public identifiers and the messaging device 160 with the business users 108, use logs of the associations and/or the public identifiers, messaging histories and the like.

Upon receiving the direct message, the business server 110 may query, at 321, the SMS database ("DB") 130 for obtaining a public identifier based on the internal identifier of the business user 108 and an identifier of the messaging device 160.

The public identifier may be an identifier that may be uniquely identifiable within certain country, district, network or the like. The public identifiers may be telephone numbers acquired from telephone service providers or from any public number authorities and, therefore, may be identified as an address of the message sender by all of the messaging devices 160 that have access to the SMS system 150. The business server 110 may maintain the list of public identifiers acquired by, e.g., an operator of the business server 110 and available for the business users 108 in a data repository, e.g., the SMS DB 130 or a directory. Additionally, the business server 110 may also maintain usages of the acquired business identifiers in the data repository, e.g., the SMS DB 130.

The business server 110 may extract the internal identifier of the business user 108 and the identifier of the messaging device 160 from the metadata of the direct message and may obtain the public identifier in a manner according to Table 1, below, which may record the associations of the business users 108 with the public identifiers. For illustrative purpose, records of Table 1 may include the associations that may be created during message exchanges between the business users 108 and the messaging devices 160. In Table 1, the field to be determined may be the public identifier, and the retrieval key may be either the internal identifier of the business user 108 or a composite key consisting of the internal identifier of the business user 108 and the identifier of the messaging device 160. Additional detail regarding the obtaining of the public identifier will be provided with reference to FIG. 10.

TABLE 1

| Composite key | | Field to be determined | Association features | |
|---|---|---|---|---|
| Identifier of business user 108 | Phone number of messaging device 160 | Public identifier | Association type | Last-use timestamp |

If there exists an association that contains the internal identifier of the business user 108 and the identifier of the messaging device 160, the public identifier contained in the association may be retrieved, at 322, and used as a sender identifier of the direct message. The association may have been created and recorded for a previous message transfer from the business user 108 to the messaging device 160.

If no such association is found in the SMS DB 130, e.g., there is no association containing the internal identifier of the business user 108 and the identifier of the messaging device 160 in Table 1, a public identifier that is not associated with the messaging device 160 may be selected, and a new association of the business user 108 with the selected public identifier and the messaging device 160 may be created and recorded in the data repository, e.g., Table 1, for future message exchanges. The selected public identifier may be used by the business server 110 to exchange messages between the business user 109 and the user of the messaging device 160.

The business server 110 may set the sender identification information of the metadata of the direct message to include the public identifier. According to some aspects of this disclosure, the association may be a permanent (or fixed) or temporary association among the business user 108, the public identifier and/or the messaging device 160. In the association that associates a combination of the public identifier and the messaging device 160 with the business user 108, the public identifier and the messaging device 160 may be referred to as being associated with each other. In some cases, "associating the combination of the public identifier and the messaging device 160 with the business user 108" may be equivalent to "associating the business user 108 with the public identifier and the messaging device 160". Additionally and/or alternatively, in the association, "associating the business user 108 with the combination of the public identifier and the messaging device 160" may be equivalent to "associating an identifier of the business user 108 with the public identifier and an identifier of the messaging device 160".

At 351, the direct message may be conveyed to the SMS system 150 with the public identifier (as sender) included in the metadata via an SMS API 120. The SMS API 120 may include a set of routines, protocols and/or tools for the business server 110 to interact with the SMS system 150. The SMS API 120 may be installed and run by the business server 110 and/or the SMS system 150.

The SMS system 150 may be a server or SMS service provider for transmitting messages to and/or receiving messages from the messaging devices 160. The SMS system 150 may include, but is not limited to, an internet network, a cellular network operated by the SMS service provider or the like. Although shown and described as separate elements for purposes of illustration only, the SMS DB 130 and/or the SMS API 120 may be integrated with the business server 110 or the SMS system 150 according to some aspects of this disclosure.

Because the messaging device 160 may receive the public identifier as the sender and the identifier of the messaging device 160 as the recipient of the direct message, the messaging device 160 may respond to the business user 108 by sending a reply message to the SMS system 150 using the public identifier as the recipient and the identifier of the messaging device 160 as the sender, at 355. As described herein, the reply message may refer to a message sent by the messaging device 160 to the business user 108 in response to the direct message. The reply message may contain a message text and metadata of the reply message. The metadata may include the identifier of the messaging device 160 as the sender identifier and the public identifier as the recipient identifier of the reply message.

When the reply message is received by the SMS system 150, the reply message including metadata of the reply message may be transferred to the SMS API 120, at 352, which conveys the reply message to the business server 110, at 312. The business server 110 may query the SMS DB 130 with the identifier of the messaging device 160 and the public identifier, at 321, where the identifier of the messaging device 160 may be included in the metadata as the sender and the public identifier may be included in the metadata as the recipient of the reply message. The internal identifier of the business user 108 may be retrieved based on the identifier of the messaging device 160 and the public identifier, at 322, in a manner according to Table 2, below. Because the combination of the identifier of the messaging device 160 and the public identifier may be unique within the messaging system 100, the business server 110 may be enabled to uniquely determine and retrieve the internal identifier of the business user 108 with the composite key consisting of the identifier of the messaging device 160 and the public identifier.

TABLE 2

| Composite key | | Field to be determined | Association feature |
| --- | --- | --- | --- |
| Identifier of the messaging device 160 | Public identifier | Identifier of the business user 108 | Last-use timestamp |

Although shown and described as separate tables for purposes of illustration only, the Table 1 and Table 2 may be an integrated data repository, e.g., Table 1 and Table 2 may be two views of the integrated data repository. Therefore, any change to the integrated data repository or to Table 1 or Table 2 may be reflected in both views.

At 332, the reply message may be transferred to business user 108A, if the internal identifier of the business user 108A is retrieved based on the identifier of the messaging device 160 and the public identifier. In general, the business user 108A may be the sender of the direct message to which the reply message corresponds.

With the messaging system 100, a business user 108 may send a direct message via the business server 110 to a selected messaging device 160, and the messaging device 160 may send a reply message back to the sender of the direct message with no ambiguity. Additionally, the business server 110 may require only a limited number of public identifiers to realize the message exchanging functionality of the messaging system 100, saving cost while enabling the unambiguous exchange of the messages; further details of techniques for using a limited number of public identifiers will be discussed below.

Although shown and described as exchanging messages to and/or from the messaging device 160 for purposes of illustration only, any other types of messaging devices may be used for exchanging the messages, including, but not limited to, desk phones and any other wired and wireless devices that may have access to or may be accessed by the SMS system 150. Although shown and described as the SMS messaging system 100 for purposes of illustration only, techniques and solutions disclosed herein may similarly apply to any messaging systems and any business or enterprise communication systems.

Figure 2:
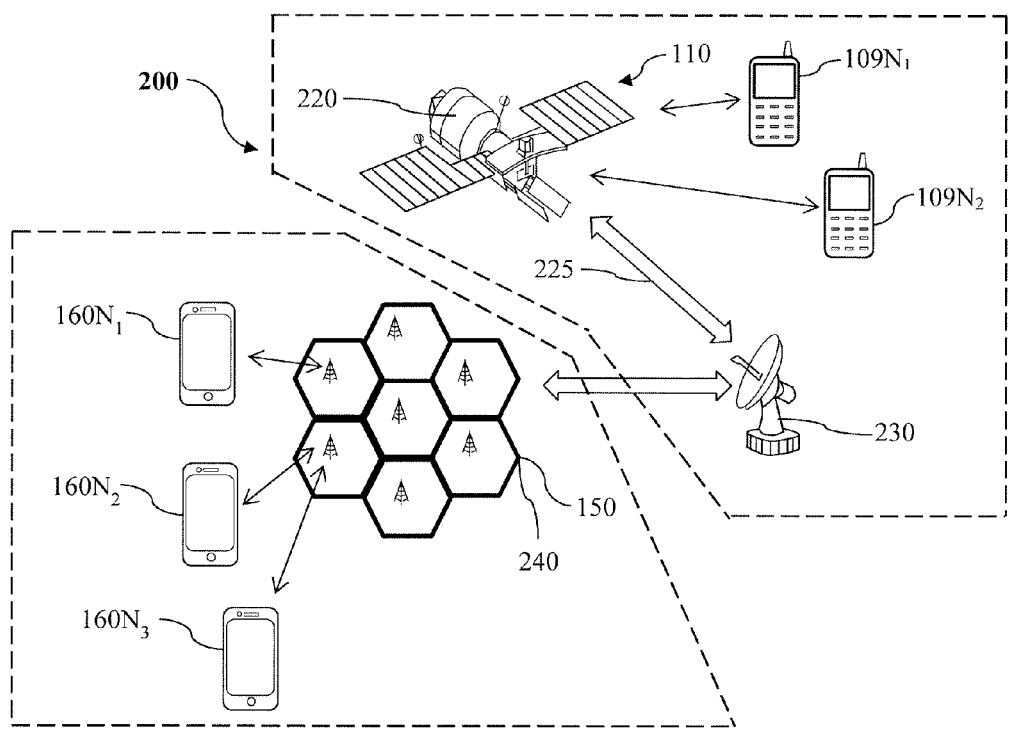
FIG. 2 shows a conceptual schematic diagram of an example of FIG. 1, according to an aspect of this disclosure.

FIG. 2 shows an example of the messaging system 100. Turning to FIG. 2, the business server 110 may be provided as a satellite-based messaging system 200. In FIG. 2, the satellite-based messaging system 200, for example, Higher Ground's SatPaq™ system, may include a plurality of business users 109 ($109N_1$, $109N_2$). The business users 109, for example, a SatPaq™ user, may employ a SatPaq™ attached to or integrated with a mobile phone, a satellite phone or any other devices that may exchange messages via a satellite.

A business user 109, e.g., a first business user $109N_1$, may send messages to and/or receive messages from a first messaging device $160N_1$, e.g., via a satellite 220. The satellite 220 may be a communications satellite or any satellite or other signal repeating station that may relay and/or amplify text signals. Because satellite 220 can provide services to the areas that may not be served by certain wireless services, e.g., cellular services, the business users 109 may be communicatively connected in remote or isolated areas.

When a direct message is sent by the business user 109 and received by the satellite 220, the direct message may be relayed to a ground station 230. The ground station 230 may include a business server 110 and/or an SMS DB 130 (collectively shown in FIG. 1). As shown and described herein, an operator of the ground station may have acquired a plurality of public identifiers, e.g., phone numbers, and may maintain the public identifiers within the SMS DB 130. The business server 110 may obtain a rented or otherwise acquired public identifier by accessing the SMS DB 130. An association record containing the business user 109, the public identifier and the messaging device 160 may be maintained or created within the SMS DB 130 for logging that the public identifier is associated with the first business user $109N_1$ and the first messaging device $160N_1$.

The direct message may be transmitted to an SMS system 150 that, e.g., may be a cellular network 240, from the ground station 230 via a SMS API 130 (shown in FIG. 1). The SMS API 130 may be installed at the ground station 230 and/or at the SMS system 150. The direct message may then be transmitted to the first messaging device $160N_1$, which may be a cellphone connected to the cellular network 240. Similarly, the first business user $109N_1$ and the other business users, e.g., a second business user $109N_2$, may send messages to any of messaging devices 160 that are connected to the SMS system 150.

Upon receiving the direct message, the first messaging device $160N_1$ may send a reply message to the business user 109 using the public identifier. Metadata of the reply message may contain the public identifier as a recipient identifier and an identifier of the messaging device 160 as a sender identifier of the reply message. The reply may be relayed via the SMS system 150, e.g., the cellular network 240, and the SMS API 130 to the ground station 230, which may include the business server 110 and the SMS DB 130. The business server 110 may query the SMS DB 130 for an internal identifier of the first business user $109N_1$ based on the public identifier or a composite key consisting of an identifier of the first messaging device $160N_1$ and the public identifier. As shown and described herein, the internal identifier of the first business user $109N_1$ may unambiguously identify the first business user $109N_1$, thereby, the reply message may be directed to the first business user $109N_1$.

The satellite-based messaging system 200 shown and described herein may be, e.g., a SatPaq™ system that is designed to serve remote and/or isolated areas, such as areas not served by other communication services including, but not limited to, the cellular network 240 or the like. In the solutions shown and described herein, the SatPaq™ system may provide a plurality of SatPaq™ users with messaging services in those areas not served by any cellular networks or wired networks and, thereby, be useful in fields of remote missions, emergency calls, self-survival, field rescue or the like.

Figure 3:
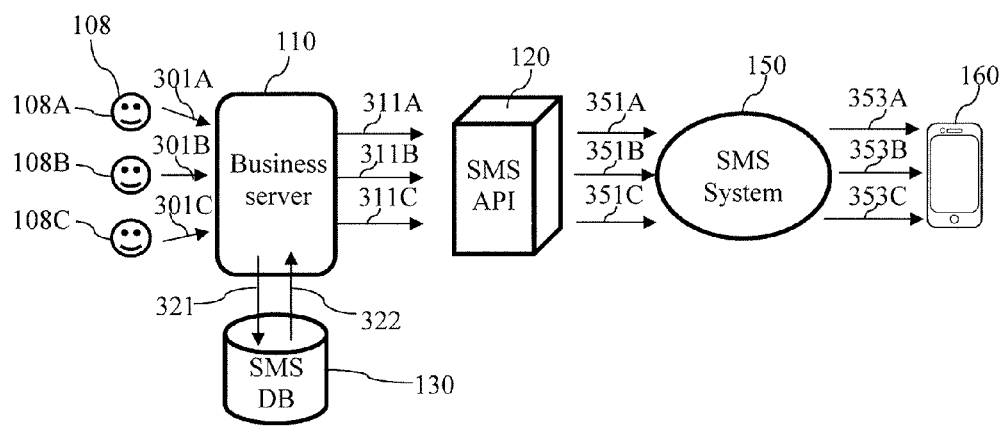
FIGS. 3-8 show conceptual diagrams of various examples of FIG. 1, according to aspects of this disclosure.

FIG. 3 shows another example of the messaging system 100. Turning to FIG. 3, a plurality of business users 108 (108A, 108B and 108C) may send messages to a messaging device 160. In FIG. 3, each of the business users 108 may have an internal identifier, or a business identifier, and may be uniquely identifiable by the internal identifier within the business server 110. The internal identifier may or may not be identifiable outside of the business server 110 and/or a business SMS environment. For example, the business user 108A may have an identifier "user_A"; the business user 108B may have an identifier "user_B"; and the business user 108C may have an identifier "user_C".

A first direct message sent by the business user 108A may be transmitted to a business server 110, at 301A, including a message text and metadata of the first direct message. The metadata may include, but is not limited to, the internal identifier of the business user 108A, which may be "user_A", and an identifier of the messaging device 160. As shown and described with reference to FIG. 1, the business server 110 may query the SMS DB 130, at 321, and obtain a first public identifier, e.g., a phone number, PN_1, at 322. The first public identifier PN_1 may be a public phone number uniquely identifiable within the SMS system 150, which may be acquired by an operator of the business messaging service from an operator of the SMS system 150 or from any other phone number authority.

If an association record containing "user_A" and the identifier of the messaging device 160 exists in the SMS DB 130, the public identifier contained in the association record may be obtained from the SMS DB 130. As shown and described herein, the association may be created and recorded when the business user 108 sends an initial direct message to the messaging device 160. If the association record does not exist, e.g., the business user 108A has not sent a direct message to the messaging device 160, the business server 110 may select a first public identifier, e.g., PN_1, and may associate the first public identifier and the identifier of the messaging device 160 with the business user 108A. When selecting the first public identifier, the business server 110 may search a list of public identifiers stored in the SMS DB 130 for a public identifier that is not associated with the same messaging device 160. A first association record may be created and stored in the SMS DB 130 for logging that the combination of the first public identifier PN_1 and the messaging device 160 is associated with the first business user 108A. The first association may be stored, e.g., in Table 1 and/or Table 2. The first public identifier PN_1 may be logged as associated with the messaging device 160, therefore, the number of public identifiers available for future association with the messaging device 160 may be reduced by one.

The business server 110 may set sender identification information of the metadata of the first direct message to be sent to messaging device 160 to the first public identifier PN_1. The first direct message with the first public identifier as the sender identifier may be transmitted to the SMS system 150 via the SMS API 120, at 311A and 351A. The SMS system 150 may transmit the first direct message to the messaging device 160, at 353A, according to the recipient identification information contained in the metadata of the first direct message. The messaging device 160 may receive the first direct message including the first public identifier PN_1 as the sender identifier and use the first public identifier to reply to the first direct message.

Similarly, a second direct message sent by the business user 108B and destined for the messaging device 160 may be transmitted to the business server 110, at 301B, including a message text and metadata of the second direct message. An internal identifier of the business user 108B may be "user_B". The business server 110 may query the SMS DB 130, at 321, and obtain a second public identifier, e.g., a second phone number PN_2, at 322. If no association record is found, the business server 110 may select a second public identifier, e.g., PN_2, and may associate the second public identifier and the identifier of the messaging device 160 with the business user 108B. When selecting the second public identifier, the business server 110 may query a list of public identifiers stored in the SMS DB 130 for a public identifier that is not associated with the messaging device 160. A second association record may be created and stored in the SMS DB 130 for logging that the combination of the second public identifier PN_2 and the messaging device 160 is associated with the second business user 108B. The second association may be stored, e.g., in Table 1 and/or Table 2.

The business server 110 may set sender identification information of the second direct message to the second direct message with the second public identifier PN_2. The second direct message with the second public identifier as the sender identifier may be transmitted to the SMS system 150 via the SMS API 120, at 311B and 351B. The SMS system 150 may transmit the second direct message to the messaging device 160, at 353B, according to the recipient identification information contained in the metadata of the second direct message. The messaging device 160 may receive the second direct message including the second public identifier PN_2 as the sender identifier and use the second public identifier PN_2 to respond to the second direct message.

A third direct message sent by the business user 108C and destined for the messaging device 160 may be transmitted to the business server 110, at 301C, including a message text and metadata of the third direct message. An internal identifier of the business user 108C may be "user_C". The business server 110 may query the SMS DB 130 at 321, and obtain a third public identifier, e.g., a third phone number PN_3, at 322. If no association record is found, the business server 110 may select a third public identifier, e.g., PN_3, and may associate the third public identifier and the identifier of the messaging device 160 with the business user 108C. When selecting the third public identifier, the business server 110 may query a list of public identifiers stored in the SMS DB 130 for a public identifier that is not associated with the messaging device 160. A third association record may be created and stored in the SMS DB 130 to log that the combination of the third public identifier PN_3 is associated with the third business user 108C. The third association may be stored, e.g., in Table 1 and/or Table 2.

The business server 110 may set sender identification information of the third direct message to the third public identifier PN_3. The third direct message with the third public identifier as the sender identifier may be transmitted to the SMS system 150 via the SMS API 120, at 311C and 351C. The SMS system 150 may transmit the third direct message to the messaging device 160, at 353C, according to the recipient identification information contained in the metadata of the third direct message. The messaging device 160 may receive the third direct message including third public identifier PN_3 as the sender identifier and use third public identifier PN_3 to respond to the third direct message.

Because the each of the business users 108 may be uniquely identified by the metadata of the messages, the messaging device 160 may be enabled to send reply messages to each of the business users 108 that sends a direct message to the messaging device 160.

Figure 4:
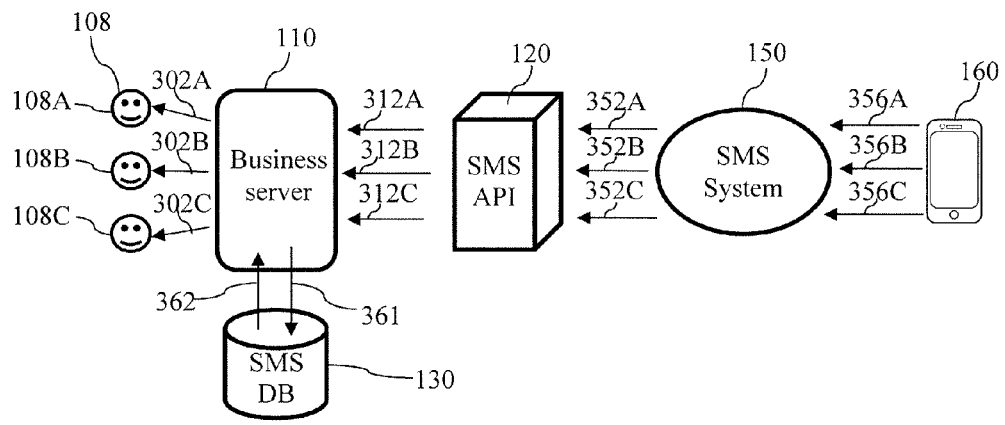

FIG. 4 further illustrates the example of the messaging system 100 of FIG. 3. Turning to FIG. 4, the messaging device 160 may send reply messages to the business users 108 (108A, 108B and 108C) after receiving the messages sent by the business users 108. As shown and described with reference to FIG. 3, the first direct message may be received by the messaging device 160 with a first public identifier PN_1 as a sender identifier. The messaging device 160 may send a first reply message to PN_1 in response to the first direct message.

The first reply message may be transmitted, at 356A, to the SMS system 150, e.g., a cellular network, which may be accessed by a plurality of messaging devices 160 (not shown). At 352A, the SMS system 150 may transmit the first reply message to the SMS API 120 that may convey the first reply message to the business server 110, at 312A. The business server 110 may query the SMS DB 130, at 361, based on a first composite key consisting of the identifier of the messaging device 160 and the first public identifier PN_1. Because the combination of the first public identifier PN_1 and the identifier of the messaging device 160 is unique, an internal identifier of the first business user 108A, which is associated with the combination, may be determined and retrieved unambiguously according to the first composite key, at 362.

Thus, the business server 110 may route the first reply message, at 302A, to the first business user 108A that may be the sender of the first direct message.

Similarly, the messaging device 160 may send a second reply message to the second business user 108B via the SMS system 150, the SMS API 120 and the business server 110, and send a third reply message to the third business user 108C via the SMS system 150, the SMS API 120 and the business server 110. The second business user 108B may be determined and retrieved unambiguously according to the combination of the second public identifier and the identifier of the messaging device 160; and the third business user 108C may be determined and retrieved unambiguously according to the combination of the third public identifier and the identifier of the messaging device 160.

Figure 5:
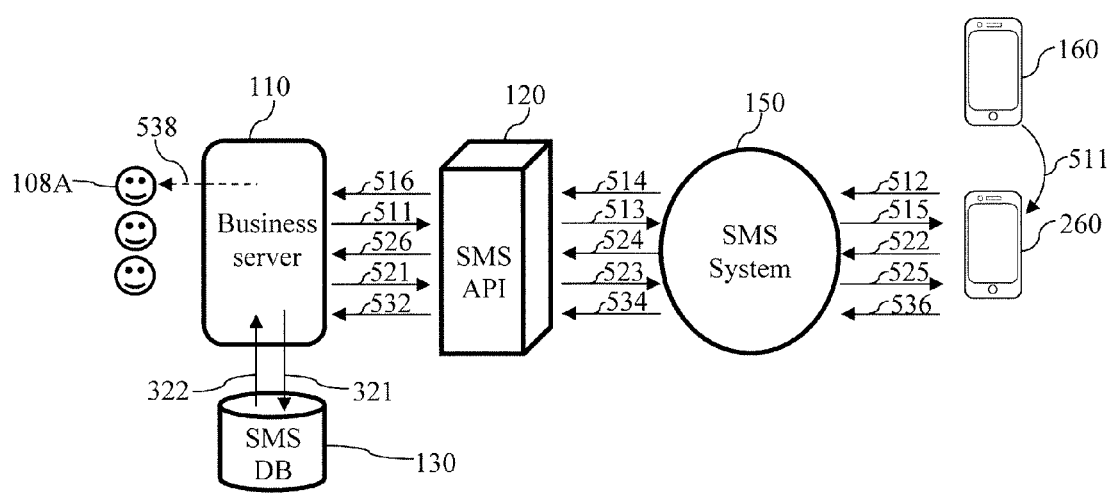

FIG. 5 shows another example of the messaging system 100. Turning to FIG. 5, a second messaging device 260 may send a message to a business user 108 using a public identifier obtained from a first messaging device 160. In FIG. 5, the first messaging device 160 may have received a message from a business user 108, e.g., a first business user 108A, and therefore, may have the public identifier PN_1 that is associated with the first messaging device 160 and the business user 108.

The second messaging device 260 may obtain the public identifier PN_1 from the first messaging device 160, at 511, and send the message using the public identifier as a recipient of the message, at 512. The message may be received by an SMS system 150, at 512, and conveyed to a business server 110 via an SMS API 120, at 514 and 516. The business server 110 may, at 321, query a SMS DB 130 based on a composite key consisting of the public identifier PN_1 and the identifier of the second messaging device 260, e.g., a phone number of the second messaging device 260. Assuming that the business user 108A or any other business user 108 has not sent a direct message to the second messaging device 260 and that, therefore, an association containing the second messaging device 260 and the public identifier PN_1 has not been recorded in a previous communication, the business server 110 may not be able to determine an internal identifier according to the composite key, at 322.

Finding no record corresponding to the public identifier and the second messaging device 260, the business server 110 may send a query message, at 511, via the SMS API 120, at 513 and the SMS system 150, at 515, to a user of the second messaging device 260. The query message may ask for additional information regarding the business user 108, including, but not limited to, a name of the business user 108, a phone number, another alphanumerical identifier of the business user 108 or the identifier of the first messaging device 160 from which the second messaging device 260 obtained the public identifier PN_1. For example, the message may say "System: business user not found, please provide the intended recipient user_ID."

The user of the second messaging device 260 may reply to the query message, at 522, via the SMS system 150 with answer(s) for further identifying the intended business user 108. For example, the answer message may say "Reply to System: the internal identifier of the business user is 'user_A'" or alternatively "'user_A'". The business server 110 may receive the answer(s), at 526, via the SMS API 120, at 524. The business server 110 may further query, at 321, the SMS DB 130 for the internal identifier of the business user 108A. If the business user 108A is found based on the answer(s), the business server 110 may associate, at 322, a second public identifier that is not associated with the second messaging device 260, e.g., PN_2, with the second messaging device 260 and the business user 108A. A further message with the second public identifier PN_2 may be sent to the second messaging device 260 from the business server 110, at 521, 523 and 525, with the second public identifier PN_2 being a sender identifier and the second messaging device 260 being a recipient of the further message. In the further message, the user of the second messaging device 260 may be informed that the second public identifier may be used for further message exchange with the business user 108A. For example, the further message may say "System: please use PN_2 to exchange messages with the business user 108A."

However, if the business user 108 is not found by the query, at 321, an alternative message may be sent to the second messaging device 260, informing the user of the second messaging device 260 that no business user 108 has been found and/or asking the second messaging device 260 to take further actions, or notifying the user of the second messaging device 260 that the message cannot be delivered to an intended business user 108.

Although shown and described as being obtained from the first messaging device 160 for purposes of illustration only, the public identifier may be obtained from any other suitable source, e.g., a website, a message from another source and/or a conversation. Alternatively and/or additionally, when the business server 110 receives the message, at 516, and fails to determine to whom the message is intended the business server 110 may send a notice message to the second messaging device 260 to inform that the message cannot be delivered. For example, the message may say "System: your message could not be delivered."

According to some aspects of this disclosure, public identifiers may be categorized into various types based upon business requirements, total number and/or privileges of the business users 108, total number and/or usages of the public identifiers, and/or the number of messaging devices 160 that wish to exchanging messages with the business users 108. Accordingly, associations containing the categorized public identifiers may be categorized into various types respectively.

According to some further aspects of this disclosure, the public identifiers may be categorized into four types, type-1, type-2, type-3 and type-4. Accordingly, associations containing type-1 public identifiers may be categorized as type-1 associations; associations containing type-2 public identifiers may be categorized as type-2 associations; associations containing type-3 public identifiers may be categorized as type-3 associations; and associations containing type-4 public identifiers may be categorized as type-4 associations. In a type-1 association, once established, the association between a business user 108 and a combination of a public identifier and a messaging device 160 may be fixed. In other words, a type-1 association may not be dissolved, and the public identifier contained in the type-1 association may not generally be reclaimed for further use with the messaging device 160 once the association is established. In a type-2 association, the association between a business user 108 and a combination of a public identifier and a messaging device 160 may not be fixed. In other words, the type-2 association may be dissolved, and the public identifier contained in the type-2 association may be reclaimed for further use with the messaging device 160 based on dynamic needs, e.g., when all of the type-2 public identifiers are associated with the messaging device 160, so the public identifier may be made available for another business user 108 to exchange messages with the messaging device 160. In a type-3 association, a unique public identifier (type-3 identifier) may be permanently assigned to a business user 108. The type-3 association is illustrated below, in conjunction with FIG. 6.

Figure 20:
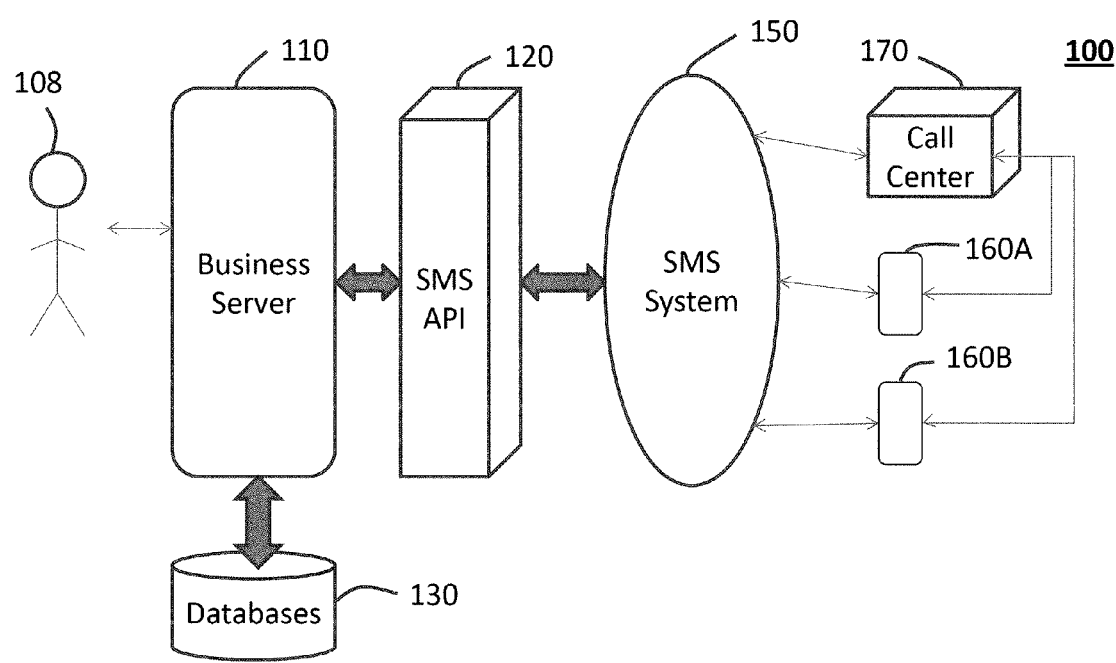
FIG. 20 shows a conceptual block diagram according to a system according to various aspects of this disclosure.

In a type-4 association, the association between a business user 108 and a combination of a public identifier and a messaging device 160 may be fixed for a short length of time. In other words, the type-4 association may be established for a specific period of time, which may correspond, for example, to the duration of a particular event (e.g., an emergency situation). The type-4 association may be dissolved afterwards, and the public identifier contained in the type-4 association may be reclaimed for further use. In one scenario, such further use may be with the messaging device 160, based on dynamic needs, e.g., when a specific scenario such as will be described below presents itself, and so the public identifier may be made available for other business users 108 to exchange messages with the messaging device 160. FIG. 20 shows an example of messaging system 100 in one such scenario, and FIG. 20 will be discussed further below. It is noted that, in the scenario represented in FIG. 20, the association may include association of the public identifier with mobile messaging devices 160 and/or stationary messaging devices, such as may be present in call center 170. According to a further aspect of the present disclosure, unlike the type-1 and type-2 identifiers, if a type-4 identifier is provided by one mobile user 160A to another mobile user 160B, and mobile user 160B may be able to send messages to the business user 108, even if the business user 108 has not previously sent a message to the mobile user 160B, as will be discussed further below.

Figure 6:
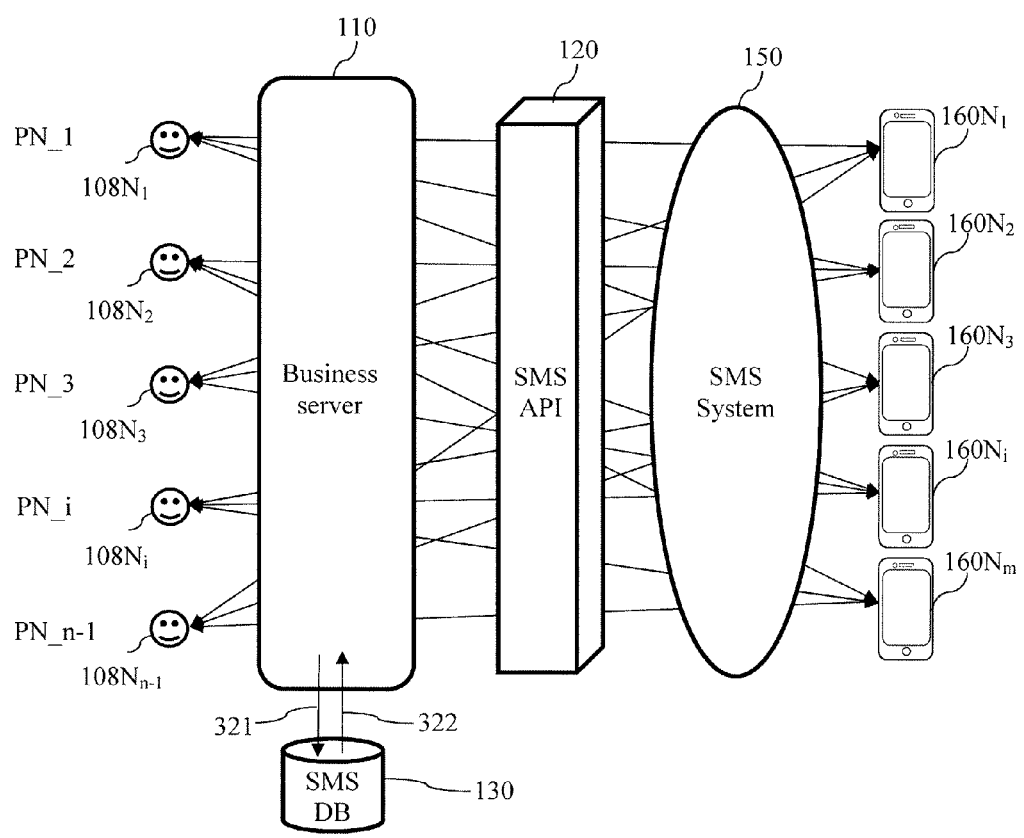

FIG. 6 shows an example of the messaging system 100. Turning to FIG. 6, a type-3 association is illustrated with each of a plurality of business users 108 being assigned a dedicated public identifier. In FIG. 6, the messaging system 100 may have n type-3 public identifiers, e.g., public phone numbers PN_1 to PN_n. PN_1 to PN_n−1 of the n public identifiers may be assigned to n−1 of the business users $108N_1$-$108N_{n-1}$, and a last public identifier PN_n may be assigned to the messaging system 100 as a generic public identifier of a business server 110.

A business user 108, e.g., a first business user $108N_1$, may use its assigned public identifier, e.g., PN_1, to send messages to multiple (unlimited number of) messaging devices 160, e.g., messaging devices $160N_1$-$160N_3$. When a specific messaging device 160 of the multiple messaging devices, $160N_1$-$160N_3$, sends a reply message to a direct message sent from the first business user $108N_1$, the first business user $108N_1$ may be determined unambiguously via the first public identifier PN_1.

Because any business user 108 may be determined with an associated public identifier, the type-3 association may be an association of the public identifier with the business user 108. Any messaging device 160 may send messages to the business user 108 with a type-3 association even if the messaging device 160 has not received a direct message from the business user 108. As described herein, type-3 association may be simple and convenient but costly; therefore, only privileged business users 108 (e.g., those willing to pay for such privileges) may be assigned with type-3 associations. Accordingly, the business users 108 assigned with the type-3 associations may be referred to as type-3 users.

According to some aspects of this disclosure, business users 108 that are not assigned with a dedicated public identifier, for example, a business user $108N_n$ (not shown) and further business users 108 (collectively not shown), may use the generic public identifier to send a direct message and/or receive a reply message. In some cases, when a business user 108 sends a direct message using the generic public identifier, the message text of the direct message may be prefixed and/or suffixed, e.g., by the business server 110.

For example, if the business user $108N_n$ is "Michael Smith" who is, e.g., a SatPaq™ user, the direct message may be sent with a prefix and/or a suffix via the generic public identifier. A direct message "Having great time on the trail" from the business user $108N_n$ to a messaging device 160 may be prefixed and/or suffixed. For example, the direct message may become "SatPaq™—message from Michael Smith: 'Having great time on the trail'. To reply start message with 'Reply to Michael Smith:'". When the intended messaging device 160 receives the prefixed and/or suffixed message from the generic identifier, the user of the messaging device 160 may reply to the generic public identifier PN_n with a message by prefixing the message text of the reply message, e.g., "Reply to Michael Smith: 'Have fun'". The business server 110 may forward the reply message to the intended recipient Michael Smith, if "Michael Smith" is found as a SatPaq™ user. Similarly, the direct message and/or the reply message may include added suffixes to identify the business user $108N_n$. The language used in the prefixes and suffixes above are for illustration only, and any other suitable language may be used as the prefixes and/or the suffixes.

It is also noted that the use of such a generic public identifier, along with prefixes and/or suffixes, may be used in combination with the other techniques disclosed herein, according to various aspects of this disclosure.

In accordance with another aspect of this disclosure, the business server 110 may identify that a message from the messaging device 260 may be an unsolicited message and, therefore, may block the message. The business server 110 may alert the sender, e.g., the user of the messaging device 260, that the message cannot be delivered, thereby, providing a security measure for blocking unsolicited messages.

Figure 7:
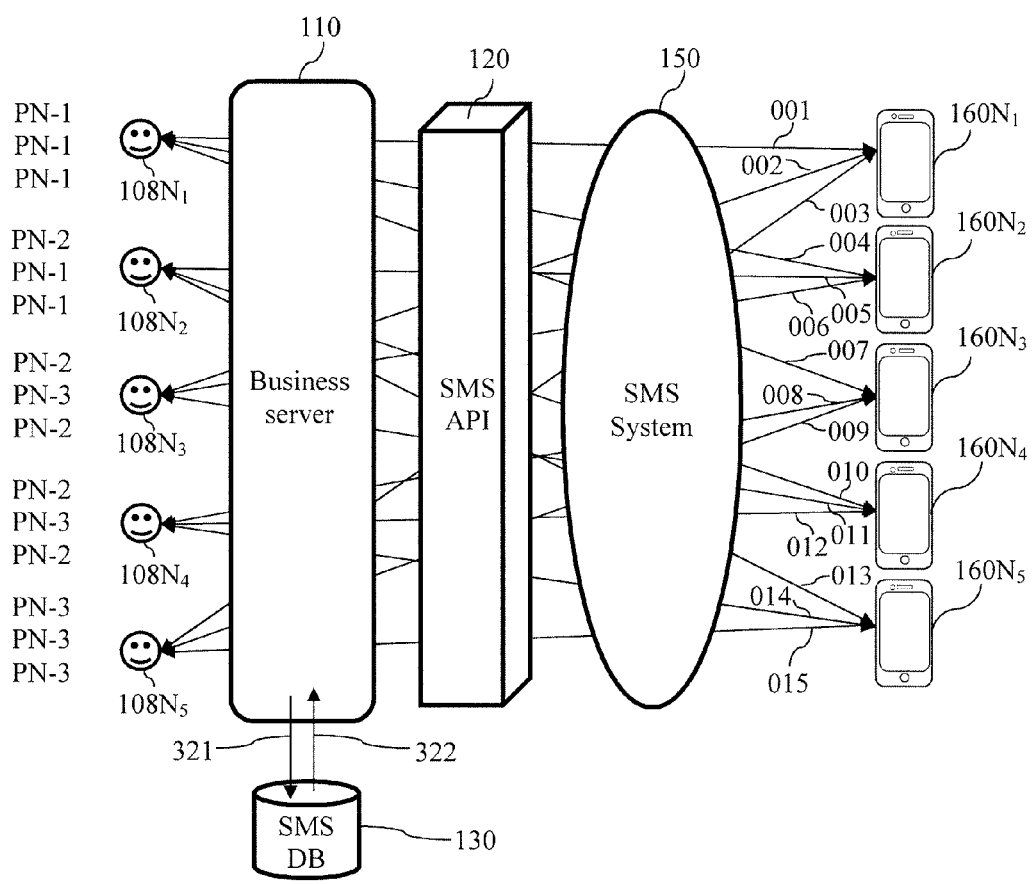

FIG. 7 shows a further example of the messaging system 100. Turning to FIG. 7, a type-1 association is illustrated with each of a plurality of business users 108 being associated with a limited number of messaging devices 160. In FIG. 7, each of the messaging devices 160 may have a limited number of associations with the business users 108, e.g., three associations, with a limited number of business users 108 and respective public identifiers. The associations described herein may be recorded in a data repository within an SMS DB 130, e.g., as association entries in Table 1 and/or Table 2 with reference to FIG. 1. In other words, a business user 108 may be associated with a messaging device 160 and a public identifier when an association entry is recorded within the data repository. Each of the business users 108 may be determined based on a public identifier and an identifier of a messaging device 160 of an association.

As shown in FIG. 7, the business server 110 may serve a number of business users 108, e.g., five business users $108N_1$-$108N_5$. A first business user $108N_1$ may be associated with combinations of a first public identifier PN-1 and a first messaging device $160N_1$, the first public identifier PN-1 and a second messaging device $160N_2$, and the first public identifier and a third messaging device $160N_3$. A second business user $108N_2$ may be associated with combinations of a second public identifier PN-2 and the second messaging device $160N_2$, the first public identifier, PN-1 and a fourth messaging device $160N_4$, and the first public identifier PN-1 and a fifth messaging device $160N_5$, respectively. A third business user $108N_3$ may be associated with combinations of the second public identifier PN-2 and the first messaging device $160N_1$, a third public identifier PN-3 and the second messaging device $160N_2$, the second public identifier PN-2 and the fourth messaging device $160N_4$, respectively. A fourth business user $108N_4$ may be associated with combinations of the second public identifier PN-2 and the third messaging device $160N_3$, the third public identifier PN-3 and the fourth messaging device $160N_4$, and the second public identifier PN-2 and the fifth messaging device $160N_5$, respectively. A fifth business user $108N_5$ may be associated with combinations of the third public identifier PN-3 and the first messaging device $160N_1$, the third public identifier PN-3 and the third messaging device $160N_3$, and the third public identifier PN-3 and the fifth messaging device $160N_5$.

An association chart for facilitating future two-directional communications (direct messages and reply messages), including routing, may be shown as Table 3:

TABLE 3

| Association number | Associated business user | Messaging device | Public identifier | Association type | Last used timestamp |
|---|---|---|---|---|---|
| 001 | $108N_1$ | $160N_1$ | PN-1 | 1 | |
| 004 | $108N_1$ | $160N_2$ | PN-1 | 1 | |
| 007 | $108N_1$ | $160N_3$ | PN-1 | 1 | |
| 005 | $108N_2$ | $160N_2$ | PN-2 | 1 | |
| 010 | $108N_2$ | $160N_4$ | PN-1 | 1 | |
| 013 | $108N_2$ | $160N_5$ | PN-1 | 1 | |
| 002 | $108N_3$ | $160N_1$ | PN-2 | 1 | |
| 006 | $108N_3$ | $160N_2$ | PN-3 | 1 | |
| 011 | $108N_3$ | $160N_4$ | PN-2 | 1 | |
| 008 | $108N_4$ | $160N_3$ | PN-2 | 1 | |
| 012 | $108N_4$ | $160N_4$ | PN-3 | 1 | |
| 014 | $108N_4$ | $160N_5$ | PN-2 | 1 | |
| 003 | $108N_5$ | $160N_1$ | PN-3 | 1 | |
| 009 | $108N_5$ | $160N_3$ | PN-3 | 1 | |
| 015 | $108N_5$ | $160N_5$ | PN-3 | 1 | |

Note that the "Association number" and "Last used timestamp" fields are shown here and in Table 4, below, but are not needed in the context of the present discussion; these will be used, however, in subsequent discussion and tables below.

Accordingly, Table 4 for determining a business user 108 may be generated based on the Table 3. When one of the messaging devices 160 sends a reply message to one of the business users 108 using a respective public identifier, a unique business user 108 may be determined based on the messaging device 160 and the public identifier.

TABLE 4

| Association number | Messaging device | Public identifier | Associated business user | Association type | Last used timestamp |
|---|---|---|---|---|---|
| 001 | 160N$_1$ | PN-1 | 108N$_1$ | 1 | |
| 002 | 160N$_1$ | PN-2 | 108N$_3$ | 1 | |
| 003 | 160N$_1$ | PN-3 | 108N$_5$ | 1 | |
| 004 | 160N$_2$ | PN-1 | 108N$_1$ | 1 | |
| 005 | 160N$_2$ | PN-2 | 108N$_2$ | 1 | |
| 006 | 160N$_2$ | PN-3 | 108N$_3$ | 1 | |
| 007 | 160N$_3$ | PN-1 | 108N$_1$ | 1 | |
| 008 | 160N$_3$ | PN-2 | 108N$_4$ | 1 | |
| 009 | 160N$_3$ | PN-3 | 108N$_5$ | 1 | |
| 010 | 160N$_4$ | PN-1 | 108N$_2$ | 1 | |
| 011 | 160N$_4$ | PN-2 | 108N$_3$ | 1 | |
| 012 | 160N$_4$ | PN-3 | 108N$_4$ | 1 | |
| 013 | 160N$_5$ | PN-1 | 108N$_2$ | 1 | |
| 014 | 160N$_5$ | PN-2 | 108N$_4$ | 1 | |
| 015 | 160N$_5$ | PN-3 | 108N$_5$ | 1 | |

According to Table 4, for example, if the first messaging device 160N$_1$ sends a message to PN-1, PN-2 or PN-3, the message may be directed to the first business user 108N$_1$, the third business user 108N$_3$ or the fifth SMS 108N$_5$ respectively. Messages sent to each public identifier from a messaging device 160 may be unambiguously directed to a respective business user 108 according to the public identifier and the messaging device 160. Similarly, if the second messaging device 160N$_2$ sends a message to PN-1, PN-2 or PN-3, the message may be directed to the first business user 108N$_1$, the second business user 108N$_2$ or the third business user 108N$_3$ respectively. If the third messaging device 160N$_3$ sends a message to PN-1, PN-2 or PN-3, the message may be directed to the first business user 108N$_1$, the fourth business user 108N$_4$ or the fifth business user 108N$_5$ respectively. If the fourth messaging device 160N$_4$ sends a message to PN-1, PN-2 or PN-3, the message may be directed to the second business user 108N$_2$, the third business user 108N$_3$ or the fourth business user 108N$_4$ respectively. If the fifth messaging device 160N$_5$ sends a message to PN-1, PN-2 or PN-3, the message may be directed to the second business user 108N$_2$, the fourth business user 108N$_4$ or the fifth business user 108N$_5$ respectively. According to Table 4, there may be no ambiguity by any combination of a messaging device 160 and a public identifier.

With type-1 associations, a business user 108 may send direct messages to an unlimited number of messaging devices 160; a messaging device 160 may reply to the business user 108 when a direct message is received from the business user 108 or when the messaging device 160 obtains the public identifier contained in the type-3 association from some other source. A type-1 association may be permanent and may not be dissolved automatically unless the type-1 association is reconfigured into a type-2 association, e.g., by an administrator of the business server 110 and/or the SMS DB 130.

With type-2 associations, to ensure that a user of each messaging device 160 may unambiguously reply to a direct message received from a business user 108, the number of public identifiers required may depend on a largest number of business-users associated with any messaging device 160. Because in a large business messaging system, this largest number may be much smaller than the total number of business-users in the messaging system, an approach in accordance with this disclosure may utilize fewer public numbers than the number of business-users. Accordingly, compared with the approach of type-1 associations, costs with type-2 associations may be reduced; and compared with the approach of type-3 associations, costs with type-1 or type-2 associations may be greatly reduced.

The number of acquired public identifiers that may be used for establishing type-2 associations may be determined by a number of business users 108 that a specific messaging device 160 may exchange messages with, e.g., a largest number of business users 108 that any messaging device 160 may need to be associated with. This largest number may be obtained or estimated based on a data repository for recording the associations, e.g., Table 3 and/or Table 4. According to some aspects of this disclosure, the business server 110 may monitor and/or track the number of public identifiers associated with respective messaging devices 160 and dynamically collect statistical data from the data repository. The largest number of associations for any messaging device 160 may be determined based on the number of association entries of a messaging device 160 with the most association entries in the data repository. According to some other aspects of this disclosure, when the largest number of associations is greater than a predetermined threshold, additional type-1 public identifiers may be acquired.

Although shown and described as having five business users 108 and five messaging devices 160 for purposes of illustration only, any number of business users 108 and/or messaging devices 160 may be associated with a suitable number of public identifiers. In a typical system in accordance to this disclosure, the business server 110 may serve tens of thousands of business users 108, or even millions of business users 108. The number of associations, between any messaging devices 160 and a community of business users 108, being supported by a typical system may be much smaller than the number of business users 108 served by the system; therefore, the costs according to this disclosure may be reduced.

Although the manner shown and described in FIG. 7 may improve usage of the acquired public identifiers, thereby, saving costs, there may be some associations that may not be used efficiently. As an example, associations 010, 011 and 015 may not have been used for a certain time duration, e.g., times during which the associations 010, 011 and 015 have not been used may exceed a predetermined duration threshold. If, for example, the first business user 108N$_1$ sends messages to the fourth messaging device 160N$_4$ and the fifth messaging device 160N$_5$, public identifiers may be needed for associating in conjunction with these new transmissions. According to some aspects of this disclosure, type-2 public identifiers may be made available to the business users 108 for sending messages to the messaging devices 160.

As shown and described herein, type-2 associations may be temporary associations and, therefore, may be dissolved when a certain condition is met (or when multiple conditions are met). Additional detail regarding the dissolving of associations will be provided with reference to FIGS. 8 and 11. A public identifier of the dissolved association may be reclaimed for another business user 108 to exchange messages with the messaging device 160 contained in the dissolved association (or with another messaging device 160 not already associated with that public identifier and not yet associated with the business user 108).

Figure 8:
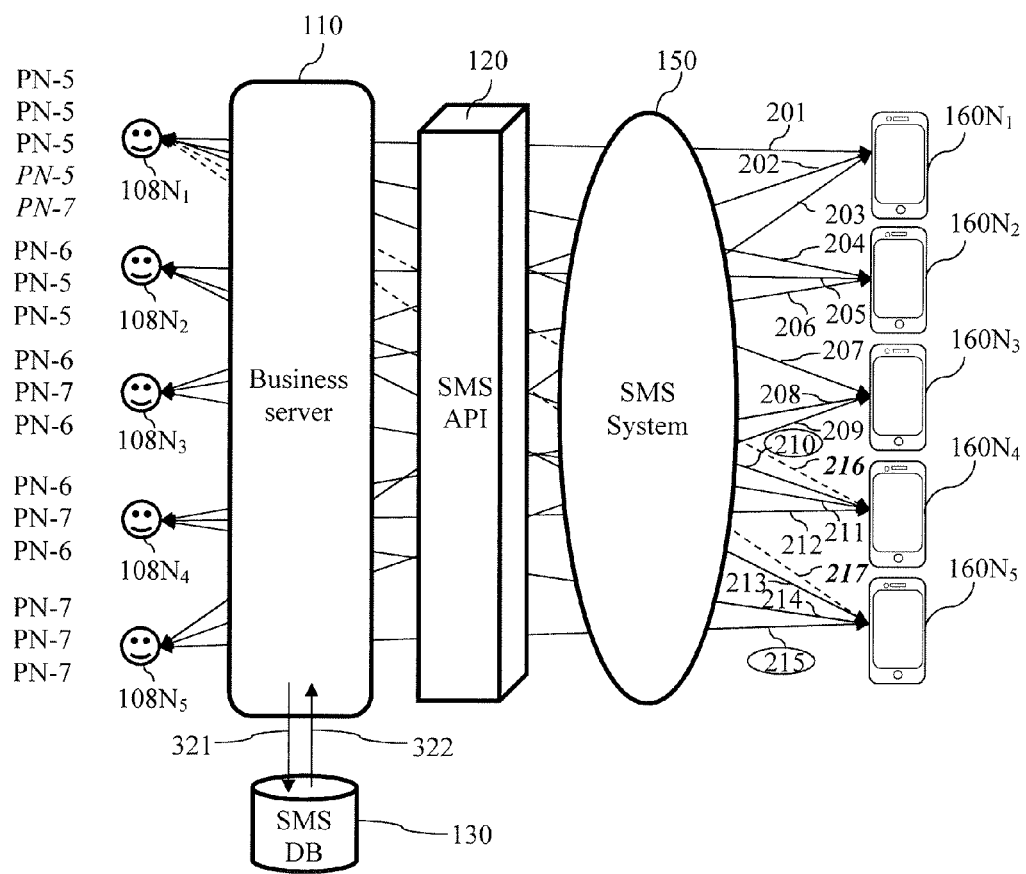

FIG. 8 shows another example of the messaging system 100. Turning to FIG. 8, type-2 associations may be dissolved, and public identifiers contained in the dissolved associations may be reclaimed. As shown in FIG. 8, business users $108N_1$-$108N_5$ may be associated with messaging devices $160N_1$-$160N_5$ and public identifiers PN-5-PN-7 as shown in Table 5. The public identifiers PN-5-PN-7 may be type-2 public identifiers and, therefore, the associations 201-215 containing the public identifiers PN-5-PN-7 may be type-2 associations.

In Table 5 below, each messaging device 160 may be associated with all three public identifiers. However, associations 210 and 215, for example, may have not been used for long durations of time. When a business user 108 sends a message to an intended messaging device 160 with which the business user 108 is not associated, e.g., business user 108A sends a message to a user of a messaging device $160N_4$, a business server 110 may select a type-2 association of the intended messaging device $160N_4$ with the oldest last-used timestamp entry from a data repository for storing the association records, e.g., an association 210 in Table 5. The selected association may be dissolved by deleting the association record from the data repository, including Table 5.

The public identifier PN-5 contained in the dissolved association may be reclaimed for another business user 108 to associate with the messaging device 160, e.g., the business user $108N_1$ to associate with the messaging device $160N_4$. For example, the business server 110 may associate an internal identifier of the business user $108N_1$ with an identifier the messaging device $160N_4$ and the reclaimed public identifier PN-5. A corresponding association 216 may be created and recorded in the data repository, e.g., Table 5. Alternatively, the association number 210 may be recycled and by used to identify the new association between the business user $108N_1$ and the messaging device $160N_4$.

Similarly, when the business user $108N_1$ sends a direct message to messaging device $160N_5$, the business server 110 may select a type-2 association of the messaging device $160N_5$ with an oldest last-used time from the data repository, e.g., an association 215 in Table 5. The selected association may be dissolved by deleting the respective association record from the data repository, e.g., an SMS DB 130, including Table 5.

The public identifier PN-7 contained in the dissolved association may be reclaimed for the business user $108N_1$ to associate with the messaging device $160N_5$. The business server 110 may associate an internal identifier of the business user $108N_1$ with an identifier of the messaging device $160N_5$ and the reclaimed public identifier PN-5. A corresponding association 217 may be created and recorded in the data repository, e.g., Table 5. Alternatively, the association number 215 may be recycled and by used to identify the new association between the business user $108N_1$ and the messaging device $160N_5$.

The Table 5 may become Table 5A below after dissolving the selected associations and the recording the new associations.

A practice example of the above-mentioned scenarios may be when the business user $108N_1$ broadcasts a message to messaging devices $160N_1$-$160N_5$ when the business user $108N_1$ has been only associated with messaging devices $160N_1$-$160N_3$. In such a case, the business server 110 may dissolve the associations 210 and 215, and may associate the business user $108N_1$ with $160N_4$ and $160N_5$ and the public identifiers contained in the dissolved associations in a manner shown and described above.

TABLE 5

| Association No. | Messaging device | Public identifier | Associated business user | Association type | Last used YYYY-MM-DD HH:MM:SS |
|---|---|---|---|---|---|
| 201 | $160N_1$ | PN-5 | $108N_1$ | 2 | 2017-01-05 10:36:08 |
| 202 | $160N_1$ | PN-6 | $108N_3$ | 2 | 2017-01-09 11:10:08 |
| 203 | $160N_1$ | PN-7 | $108N_5$ | 2 | 2017-01-10 17:10:08 |
| 204 | $160N_2$ | PN-5 | $108N_1$ | 2 | 2017-01-08 18:10:08 |
| 205 | $160N_2$ | PN-6 | $108N_2$ | 2 | 2017-01-03 09:10:08 |
| 206 | $160N_2$ | PN-7 | $108N_3$ | 2 | 2017-01-02 10:10:08 |
| 207 | $160N_3$ | PN-5 | $108N_1$ | 2 | 2017-01-01 18:10:08 |
| 208 | $160N_3$ | PN-6 | $108N_4$ | 2 | 2017-01-07 19:10:08 |
| 209 | $160N_3$ | PN-7 | $108N_5$ | 2 | 2017-01-08 11:10:08 |
| 210 | $160N_4$ | PN-5 | $108N_2$ | 2 | 2016-12-08 11:28:08 |
| 211 | $160N_4$ | PN-6 | $108N_3$ | 2 | 2017-01-10 10:28:08 |
| 212 | $160N_4$ | PN-7 | $108N_4$ | 2 | 2017-01-09 10:10:08 |
| 213 | $160N_5$ | PN-5 | $108N_2$ | 2 | 2017-01-10 10:10:08 |
| 214 | $160N_5$ | PN-6 | $108N_4$ | 2 | 2017-01-08 10:10:08 |
| 215 | $160N_5$ | PN-7 | $108N_5$ | 2 | 2016-12-09 11:28:08 |

Accordingly, when the first business user $108N_1$ sends a direct message to the fourth messaging device $160N_4$, the fourth messaging device $160N_4$ may receive metadata of the direct message, including the public identifier PN-5 as sender of the direct message. When the fourth messaging device $160N_4$ sends a reply message using the public identifier PN-5, the business server 110 may determine the internal identifier of the first business user $108N_1$ based on the public identifier PN-5 and the identifier of the fourth messaging device 160 $N_4$. Therefore, the reply message may be directed to the first business user $108N_1$. Similarly, when the first business user $108N_1$ sends a direct message to the fifth messaging device $160N_5$, the fifth messaging device $160N_5$ may receive metadata of the direct message including the public identifier PN-7 as sender of the direct message. Accordingly, when the fifth messaging device $160N_5$ sends a reply message using the public identifier PN-7, the business server 110 may determine the internal identifier of the first business user $108N_1$ based on the public identifier PN-7 and the identifier of the fifth messaging device $160N_5$. Therefore, the reply message may be directed to the first business user $108N_1$ unambiguously.

TABLE 5A

| Association No. | Messaging device | Public identifier | Associated business user | Association type | Last used |
|---|---|---|---|---|---|
| 201 | $160N_1$ | PN-5 | $108N_1$ | 2 | 2017-01-05 10:36:08 |
| 202 | $160N_1$ | PN-6 | $108N_3$ | 2 | 2017-01-09 11:10:08 |
| 203 | $160N_1$ | PN-7 | $108N_5$ | 2 | 2017-01-10 17:10:08 |
| 204 | $160N_2$ | PN-5 | $108N_1$ | 2 | 2017-01-08 18:10:08 |

TABLE 5A-continued

| Association No. | Messaging device | Public identifier | Associated business user | Association type | Last used |
|---|---|---|---|---|---|
| 205 | $160N_2$ | PN-6 | $108N_2$ | 2 | 2017-01-03 09:10:08 |
| 206 | $160N_2$ | PN-7 | $108N_3$ | 2 | 2017-01-02 10:10:08 |
| 207 | $160N_3$ | PN-5 | $108N_1$ | 2 | 2017-01-01 18:10:08 |
| 208 | $160N_3$ | PN-6 | $108N_4$ | 2 | 2017-01-07 19:10:08 |
| 209 | $160N_3$ | PN-7 | $108N_5$ | 2 | 2017-01-08 11:10:08 |
| 216 | $160N_4$ | PN-5 | $108N_1$ | 2 | 2017-01-11 10:28:08 |
| 211 | $160N_4$ | PN-6 | $108N_3$ | 2 | 2017-01-10 12:28:08 |
| 212 | $160N_4$ | PN-7 | $108N_4$ | 2 | 2017-01-09 14:10:08 |
| 213 | $160N_5$ | PN-5 | $108N_2$ | 2 | 2017-01-10 19:10:08 |
| 214 | $160N_5$ | PN-6 | $108N_4$ | 2 | 2017-01-08 10:10:08 |
| 217 | $160N_5$ | PN-7 | $108N_1$ | 2 | 2017-01-11 11:28:08 |

According to some other aspects of this disclosure, the number of available public identifiers, e.g., unused public identifiers, for each messaging device 160 may be maintained according to a predetermined threshold. The predetermined threshold may be a percentage of all type-2 public identifiers, e.g., eighty percent of all type-2 public identifiers, or an absolute number, e.g., ten available public identifiers, e.g., unused public identifiers. When a level of the available combinations falls below the predetermined threshold for a specific messaging device 160, the business server 110 may identify one or more selected associations as dissolvable. According to some aspects of this disclosure, a selected dissolvable association may be marked with a flag field in the data repository, e.g., with a "dissolvable flag" column (not shown) in Tables 1-5. The selected associations may have not been used for the longest durations or for a predetermined duration. Associations identified as dissolvable may be dissolved when another business user 108 sends a direct message to the specific messaging device 160 and requires a public number to establish a new association. However, if an association marked as dissolvable is used before the association is dissolved, the dissolvable mark of the association may be removed.

As described above, one of the advantages of a system in accordance with some aspects of the present disclosure is its ability to block unsolicited spam messages from mobile devices 160. While this feature may enhance the security of the system, it may interfere with emergency operations in which mobile users 160 may need to share the public identifier of the business user 108.

As an example, suppose that business user 108 is a hiker who experiences an emergency situation and is in need of help. Business user 108 may compose a message, such as "Got lost in the mountains; please help," and may send it to a friend or to an emergency response center (ERC) 170, as shown in FIG. 20. The message may be sent using a type-2 message and, as such, may use a temporary message association that cannot be shared with other mobile users. The ERC agent may obtain the GPS coordinates from which the message was sent from the message and may recruit a search and rescue team to provide the requested help. Given the fact that type-2 public identifiers cannot be shared with other users, however, if the ERC agent (not shown) were to share the type-2 public identifier of the business user 108 with the search and rescue team members, the search and rescue team members would be blocked from sending messages to the business user (hiker) 108. This feature that may block spam messages may interfere with the search and rescue operation or make it rather inefficient by requiring the search and rescue team members to communicate via the ERC agent. Specifically, messages from the hiker 108 may need to be sent to the ERC agent who could forward them to the search and rescue team members. Similarly, the search and rescue team members would need to send their questions and responses to the ERC agent for forwarding to the hiker 108. Clearly, this mode of operation is slow and inefficient and may hinder the rescue operation.

The type-4 association may be used to overcome the limitation described above. The operation of a type-4 association is illustrated by the following example. A business user (hiker, in our example) 108 may send an emergency help request to an ERC 170. The system may forward the message to an ERC agent, including the GPS location from which the request for help was sent. In accordance with an aspect of this disclosure, the system may use the GPS location from which the message was sent to retrieve a phone number of local emergency support resources, such as search and rescue, local sheriff, ranger, or other emergency response personnel. The system may utilize the NENA (National Emergency Number Association) database to obtain the contact information for the local emergency authority that may be in the best position to help the hiker 108. The number of this emergency authority may be retrieved automatically by the system based on the GPS location from which the message was sent, or alternatively, it could be retrieved manually. In either case, the ERC agent may establish connection with the local emergency authority that is best equipped to help the hiker 108.

In accordance with one specific aspect of this disclosure, the ERC agent may convey the message from hiker 108 to the local emergency authority. However, given the fact that business server 110 may have sent the emergency request for help using a type-2 message, if the ERC agent were to provide the public identifier of the hiker 108 to the local emergency personnel, they would not be able to send direct messages to the hiker because their messages would be treated like any other spam messages and blocked.

To overcome this problem and to facilitate direct communication between the hiker 108 and the mobile user 160 (search and rescue team in our example) a type-4 association may be used. In accordance with aspects of this disclosure, the ERC agent (or any other authorized person) may assign a type-4 public identifier to the hiker 108. It should be noted that this public identifier may be assigned in addition to other public identifiers (type-2 or type-1) that were previously associated with the user 108. However, if a user has a unique public identifier of type-3, the system may use this number rather than assign a new type-4 public identifier to the user.

In accordance with aspects of this disclosure, a type-4 public identifier may be uniquely associated with the specific business user 108 (hiker) and treated as a temporary type-3 public identifier. The ERC agent may convey the type-4 public identifier to the emergency response team, and any message from any mobile user 160 (emergency response team member) who has received and used the public identifier may be delivered to the business user (hiker) 108. The hiker 108 could then respond to messages and queries from the search and rescue team members, and his response may be delivered promptly, as per the description above.

In accordance with yet another aspect of the present disclosure, a type-4 public identifier may be configured as a broadcast group identifier. The ERC agent (or any other authorized person) may add the public identifiers of the search and rescue team members to the association and, as such, messages from any rescue team members 160 or from the business user 108 (hiker) may be sent to all users associated with the event corresponding to the type-4 association. This feature may help disseminate the information to all team members and prevent the rescue team members from asking the same questions that the hiker previously answered in response to other team members. In accordance with yet another aspect, when a new emergency responder is added to the type-4 association, that responder may receive the whole history of the communication related to the specific event.

In accordance with yet another aspect, each event (e.g., lost hiker, injured skier, etc.) may be assigned a specific type-4 public identifier, and at the end of a particular event, the type-4 association for that event may be dissolved, and the type-4 public identifier may be reclaimed. As part of process of dissolving the type-4 association, the system may send a message to all of the members of the type-4 association, advising them that the specific type-4 public identifier has been reclaimed and that the association is about to be dissolved.

The process of sharing the temporary public identifier with multiple mobile users 160 can take place in accordance with various aspects of this disclosure. In accordance with a first example scenario, the system administrator (or someone with administrative privileges over the business server 110 may configure the numbers of the mobile devices 160 of the, e.g., search and rescue personnel who should have access to the event's communication. In this case, the entries in the association table may be entered manually by the business server administrator.

In accordance with a second example scenario, the association tables may be populated automatically by the system as new mobile users 160 attempt to communicate with the business user 108 (the hiker in our example). In accordance with a specific scenario, as the hiker 108 sends a message to the search and rescue center 170, requesting help, the call center 170 may assign a case or an event ID (e.g., a number) to the event and may notify the local search and rescue team of the temporary public identifier and the event ID that were assigned to the event. When a search and rescue team member 160 attempts to send a text message to the business user (hiker) 108 for the first time, the system server 110 may attempt to find an identifier (e.g., telephone number) of the mobile device 160 user (e.g., search and rescue (SaR) person). When the system does not find the number of the SaR device in its association tables, it may send a message to the SaR device, such as "please enter the event number," or "please enter the ID of the person who provided you this number". Once the SaR person sends a reply message with the requested information, the system server 110 may use this information to identify the messaging group to which the user may be added and may add that user's mobile device ID into the association table. Once the user is added to the association table, the user may pass the temporary public identifier associated with the event to other users (such as other SaR team members), who may use this temporary public identifier to join and to establish associations between their mobile numbers and the business user, using the temporary public identifier.

It should be noted that in its simplest scenario, the joining algorithm may be promiscuous, allowing any user who sends a message to the type-4 temporary public identifier to send messages to the business user 108. However, although possible, this may not be the best mode of practice, as it may allow spectators and others to jeopardize or otherwise adversely affect SaR operations. The validation process described above, however, provides a flexible method that may facilitate sharing the type-4 temporary public identifier among SaR team members, while keeping others from joining the message exchange.

In accordance with a further aspect of this disclosure, the IDs of the SaR mobile devices may be known and may be automatically added to the association tables in the business server 110 as part of identifying the specific subset of mobile numbers (specific SaR team) based on information from the NENA database.

According to further aspects of this disclosure, the system may be configured to facilitate one-to-one, one-to-many, or many-to-many communication modes. In the one-to-one mode, the business user 108 may send a message to a specific mobile number, such as a SaR team member, and that SaR team member may reply directly to the business user 108 (such as a hiker). In the one-to-many communication mode, messages from the business user 108 may be forwarded to all of the mobile members who belong to at least a subset of associated mobile users (such as members of a specific SaR team). The members may be able to reply to the business user 108 using the temporary public identifier assigned to the business user 108 for the event. In the many-to-many communication mode, any message sent by the business user 108 or a by a member of the subset of the mobile device users (such as members of a specific SaR team) may be forwarded to all of the numbers of the said association (i.e., the business user 108, associated SaR team members, etc.). In essence, this may create a conference bridge or a chat exchange for these users. This may be particularly useful for the SaR team, as everyone on the team may be provided with access to the same information, thus eliminating the need for different SaR members to present the same (or similar) questions to the business user.

Figure 9:
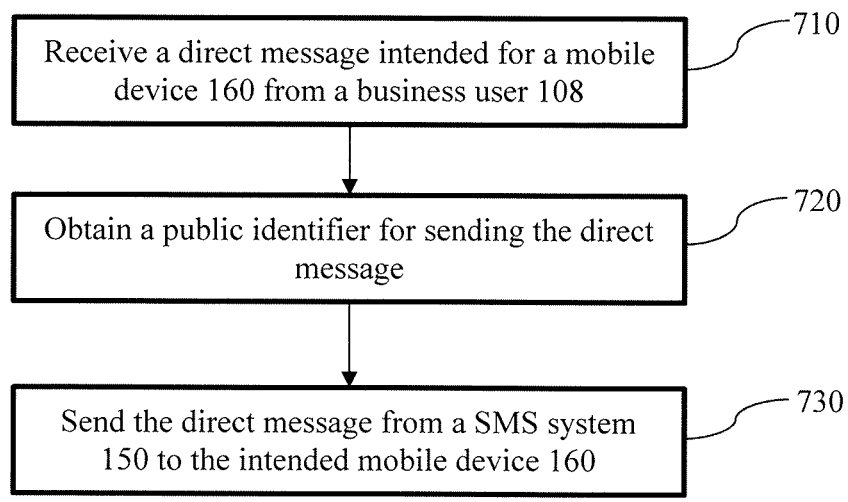
FIG. 9 shows a top-level conceptual block diagram of a example process that may be performed in the examples of FIGS. 1-6, according to an aspect of this disclosure.

FIG. 9 shows an example method 700 for exchanging messages between a business user 108 and a messaging device 160. Turning to FIG. 9, a direct message may be received, at 710. The direct message may be sent from a business user 108 and intended for a specific messaging device 160 as a recipient of the message. The direct message may be received, e.g., by a business server 110 (shown in FIG. 1) that may serve a number of business users 108. The direct message may include a message text and metadata of the message text. The metadata may include, but is not limited to, sender identification information and recipient identification information. The sender identification information received, at 710, may include an internal identifier of the business user 108, which may be identifiable by the business server 110, but may or may not be identifiable outside of the business server 110.

When the direct message is received, a public identifier may be obtained, at 720, for sending the direct message from the business user 108 to the selected messaging device 160. The public identifier may be obtained by either retrieving the public identifier from an association containing the business user 108 and the selected messaging device 160 or by associating the business user 108 with a public identifier based on the business user 108 or the intended messaging device 160, or based on the business user 108 and the intended messaging device 160 depending on whether such public identifier is, e.g., unused. The metadata of the direct message may be set to include the associated public identifier as a sender and the selected messaging device 160 as a recipient of the direct message.

At 730, the direct message may be transmitted to the intended messaging device 160 via an SMS system 150. The public identifier and the recipient identification information included in the metadata of the first message may be transmitted to the recipient and may subsequently be used to send a reply message from the selected messaging device 160 to the business user 108.

Figure 10:
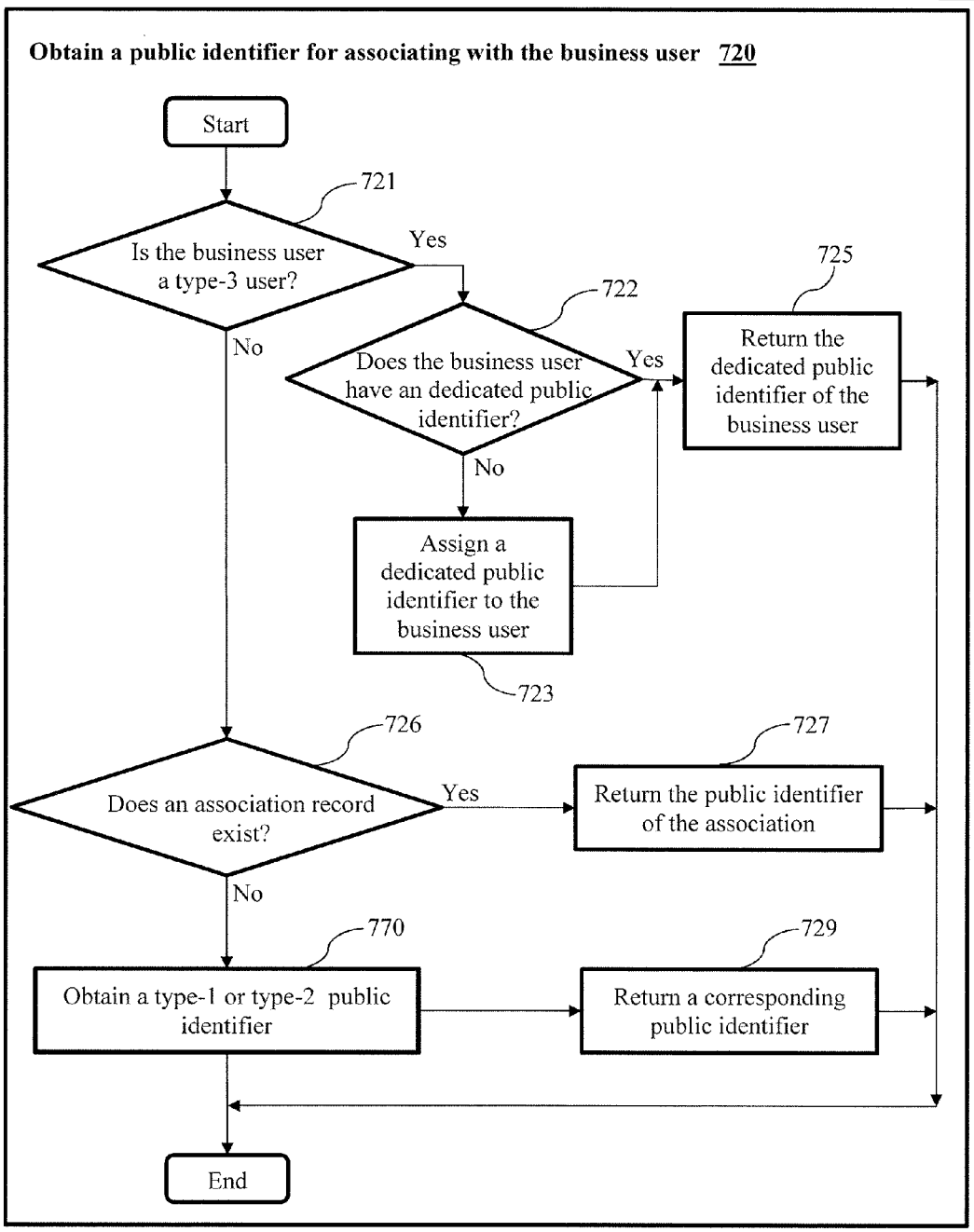
FIGS. 10-12 show conceptual flowcharts of various examples of FIG. 8, according to aspects of this disclosure.

FIG. 10 shows an example of a sub-process of the method 700 of FIG. 9. Turning to FIG. 10, an example process of step 720 of the method 700 is further articulated, i.e., a public identifier may be obtained for associating the messaging device 160 with the business user 108. In FIG. 10, whether the business user 108 is a type-3 user may be assessed, at 721. The business user 108 may be assessed, e.g., by querying the SMS DB 130 (shown in FIG. 1) based on an identifier of the business user 108, e.g., the internal identifier of the business user 108.

If the business user 108 is a type-3 user, whether the business user 108 has an assigned dedicated public identifier may be assessed, at 722. Assignment of the dedicated public identifier may be assessed by querying the SMS DB 130 based on the internal identifier of the business user 108.

If a dedicated public identifier is already assigned to the business user 108, the dedicated public identifier of the business user 108 may be returned, at 725, after the public identifier is retrieved from the SMS DB 130. Because the public identifier may be dedicated to the business user 108, the public identifier may be used as a sender identifier of the business user 108 for sending the direct message.

If no dedicated public identifier is assigned to the business user 108, an unassigned public identifier dedicated to type-3 business users may be retrieved and may be assigned to the business user 108, at 723, as a dedicated public identifier of the business user 108. Assignment of the public identifier to the business user 108 may be recorded, e.g., in the SMS DB 130. The public identifier assigned to the business user 108 may be returned, at 725, for being used to identify the business user 108 as the sender of the direct message intended to the messaging device 160. In accordance with a further aspect of this disclosure, all of the public identifiers may be pre-assigned by a system administer as part of commissioning the system and, thus, steps 722 and 723 may not be executed.

If the business user 108 is not a type-3 user, other processes may be performed. For example, at 726, whether an association record containing the intended messaging device 160 and the business user 108 exists may be assessed. If yes (i.e., an association exists), the public identifier contained in the association may be returned, at 727. The association may contain a type-1 public identifier or a type-2 public identifier. The business user 108 may be identifiable by the business server 110 based upon a combination of the public identifier and the identifier of the messaging device 160.

If no (i.e., no association containing the intended messaging device 160 and the business user 108 exists), a selected type-1 or type-2 public identifier may be obtained, at 770, and a new association of the business user 108 may be recorded. The new association may associate the business user 108 with a combination of the selected public identifier and the intended messaging device 160. The selected public identifier may be returned, at 729, and used as the sender of the direct message intended to be sent to the messaging device 160.

Figure 11:
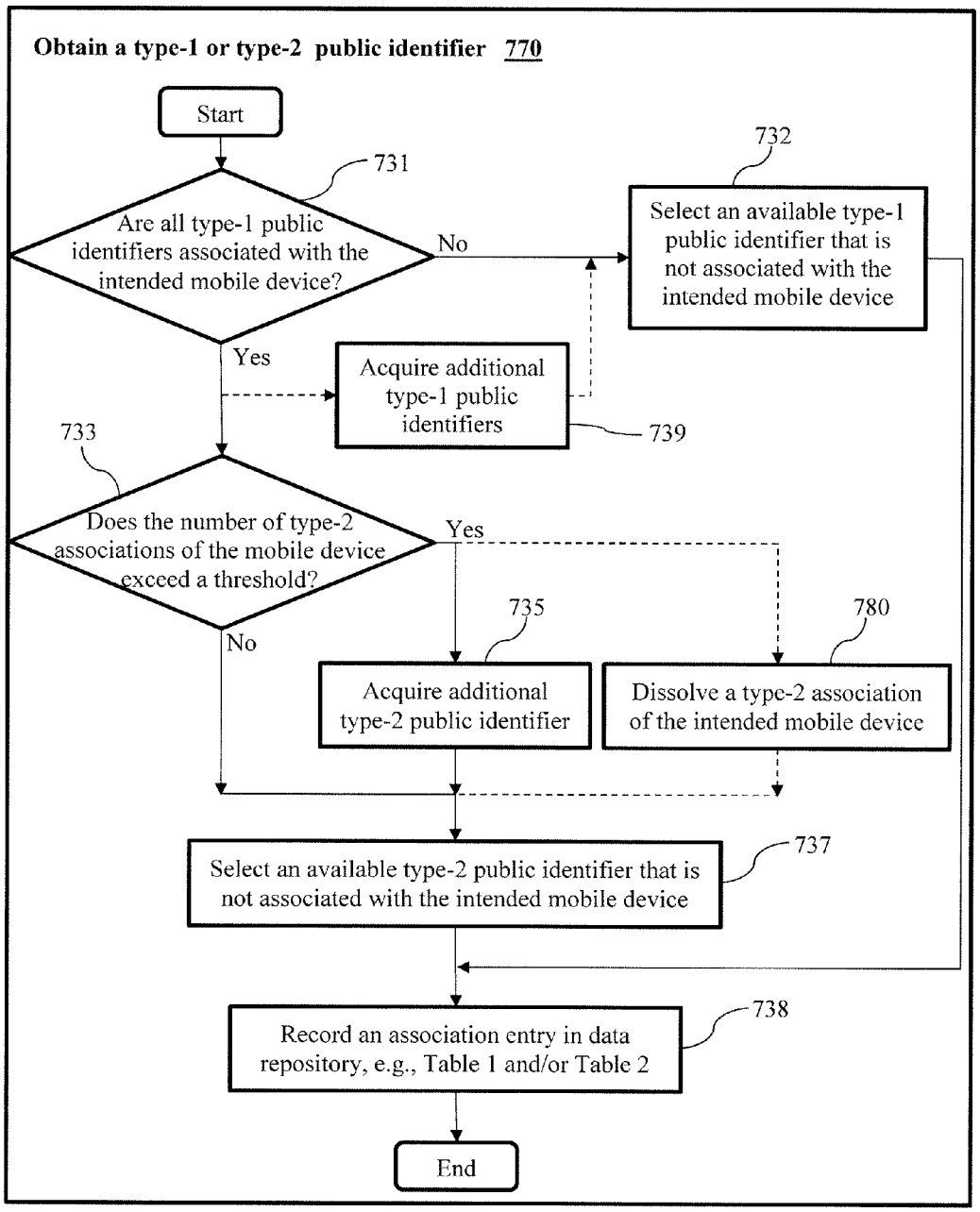

FIG. 11 shows an example of a sub-process of the method 700 of FIG. 10. Turning to FIG. 11, an example process of step 770 of the method 700 is further articulated, i.e., a type-1 or type-2 public identifier may be obtained, at 770, for a business user 108 to send a direct message to an intended messaging device 160. In FIG. 11, the business user 108 may not be a type-3 user and no association containing the business user 108 and the intended messaging device 160 may exist.

At 731, whether all type-1 public identifiers are already associated with the intended messaging device 160 may be assessed. As shown and described herein, each of type-1 or type-2 public identifiers may be associated with more than one messaging device 160. The number of type-1 public identifiers for associating the intended messaging device 160 may be limited, e.g., for cost saving purposes. According to some aspects of this disclosure, a respective messaging device 160 may be associated with available type-1 public identifiers before being associated with type-2 public identifiers.

If not all type-1 public identifiers are associated with the intended messaging device 160, a type-1 public identifier not associated with the intended messaging device 160 may be selected, at 732. As shown and described above, all type-1 public identifiers and/or type-1 public identifiers associated with the intended messaging device 160 may be retrieved from the SMS DB 130. The type-1 public identifier may be selected based on the retrieved results from the SMS DB 130.

If all type-1 public identifiers are associated with the intended messaging device 160, the process may proceed further. At 733, whether the number of type-2 public identifiers associated with the intended messaging device 160 exceeds a predetermined threshold may be assessed. In some cases, the predetermined threshold may be calculated by multiplying the number of all type-2 public identifiers by a predetermined percentage that may be a percentage value selected, e.g., between sixty percent and ninety-five percent. Alternatively, in accordance with a further aspect of this disclosure, the percentage value may be equal to one hundred percent, meaning the total number of type-2 public identifiers.

If yes (the number of type-2 public identifiers associated with the intended messaging device 160 is greater than the predetermined threshold), one additional type-2 public identifier may be acquired, at 735. The additional type-2 public identifiers may, for example, be acquired by renting or purchasing from an SMS system 150 (shown in FIG. 1). Alternatively and/or additionally, a selected type-2 association of the intended messaging device 160 may be dissolved, at 780. The public identifier retrieved from the dissolved association may be made available for associating with the business user 108 and the intended messaging device 160. Additional detail regarding dissolving an association of an intended messaging device 160 will be set forth with reference to FIG. 12.

If the number of type-2 public identifiers associated with the intended messaging device 160 does not exceed the predetermined threshold or when at least one public identifier is made available for associating the business user 108 with the intended messaging device 160, a type-2 public identifier not associated with the intended messaging device 160 may be selected, at 737.

An association for the business user 108 with a combination of the selected public identifier and the intended messaging device 160 may be created and recorded, at 738. The association may be stored in the SMS DB 130 for future queries of association entries.

Alternatively and/or additionally, when all type-1 public identifiers are associated with the intended messaging device 160, additional type-1 public identifiers may be acquired, at 739. The public identifiers may be acquired by renting or purchasing from the SMS system 150 or from any other suitable authority.

Figure 12:
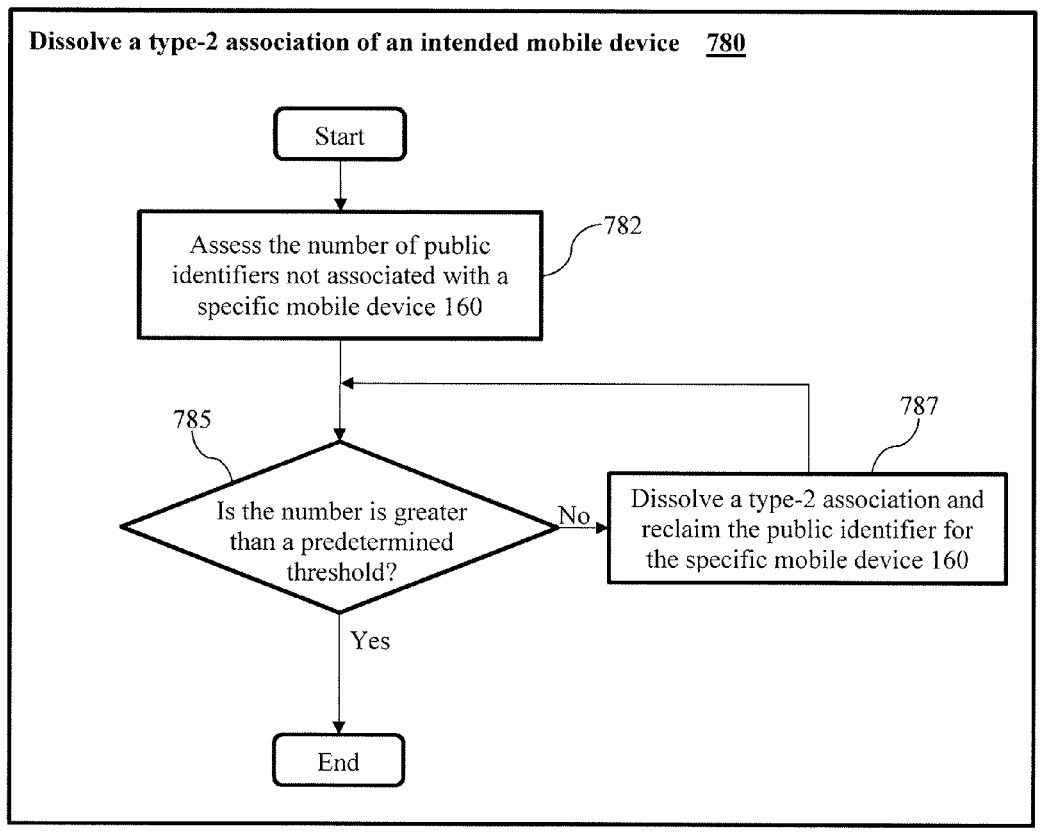

FIG. 12 illustrates an example of a sub-process of the process of FIG. 11. Turning to FIG. 12, an example process of step 780 of the method 700 is further articulated, i.e., a type-2 association of an intended messaging device 160 may be dissolved, at 780. In FIG. 12, the number of public identifiers that are not associated with the intended messaging device 160 may be assessed, at 782.

If the number of public identifiers that are not associated with the intended messaging device 160 is determined to be greater than a predetermined threshold (which may, for example, be zero or greater), at 785, no existing association may be needed to be dissolved. If the number is determined not to be greater than the predetermined threshold, a type-2 association of the intended messaging device 150 may be dissolved, and a public identifier of the association may be reclaimed with respect to the intended messaging device, at 787.

As described herein, a public identifier may be assigned to a type selected from, e.g., three types. Each type-3 public identifier may be permanently assigned to a selected business user 108 and be used to exchange messages with multiple messaging devices 160. Each type-1 public identifier in association with a specific messaging device 160 may be used to permanently and unambiguously identify a specific business user 108. The same public identifier may be used to associate the same business user 108 with another (different) messaging device 160. Each type-2 public identifier may be dynamically associated with or reclaimed from one or more business users 108 and one messaging device 160. A type-2 public identifier may be reclaimed by dissolving an association containing an identifier of the messaging device 160 and the type-2 public identifier.

A given messaging device 160 may have multiple type-2 associations with multiple public identifiers and multiple business users 108. A candidate association to be dissolved, at 787, may be an association that has an oldest last-use timestamp. Alternatively, the candidate association may be an association with the oldest creation timestamp or an association that is older than a predetermined duration threshold.

Figure 13:
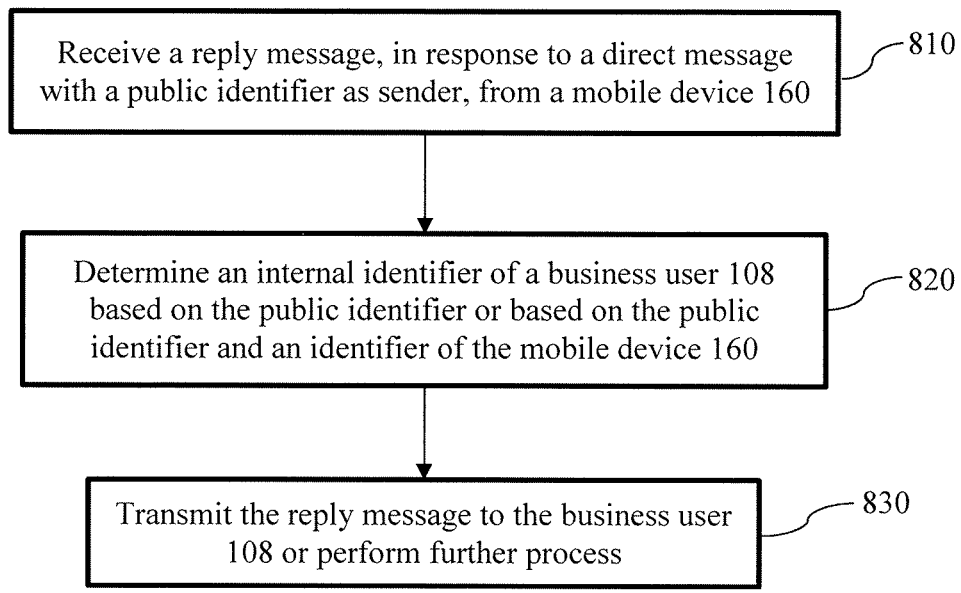
FIG. 13 shows a top-level conceptual block diagram of a further example process that may be performed in the examples of FIGS. 1-6, according to an aspect of this disclosure.

FIG. 13 shows a further example of the method 800. Turning to FIG. 13, a reply message may be received, at 810, e.g., by the SMS system 150 (shown in FIG. 1). The reply message may be sent from a messaging device 160 and intended for a business user 108 using a public identifier. The reply message may include a message text and metadata of the message text. The metadata of the message text may contain sender identification information and recipient identification information, where the sender identification information may be set to an identifier of the messaging device 160 and the recipient identification information may be set to a public identifier for indicating a business user 108.

The business user 108 may be identified, at 820, based on the public identifier or based on the public identifier and an identifier of the messaging device 160, for directing the reply message to the business user 108. An internal identifier of the business user 108 may either be determined by the public identifier or by a combination of the public identifier and the identifier of the messaging device 160, or may be obtained by a further process. Additionally, the intended recipient identification information contained in the metadata of the reply message may be set to the internal identifier of the business user 108. Additional detail regarding the identifying of the business user 108 will be provided with reference to FIG. 14.

The reply message may be transmitted to the identified business user 108, at 830, or a further process may be performed, depending on whether the business user 108 is determined at 820. Because the identified business user 108 may be uniquely identified within the business server 110 (shown in FIG. 1), the reply message may be routed to the business user 108 with no ambiguity. If the business user 108 is not determined at 820, further information may be requested by the business server 110 from the messaging device 160. Additional detail regarding the requesting of further information will be provided with reference to FIG. 15.

Figure 14:
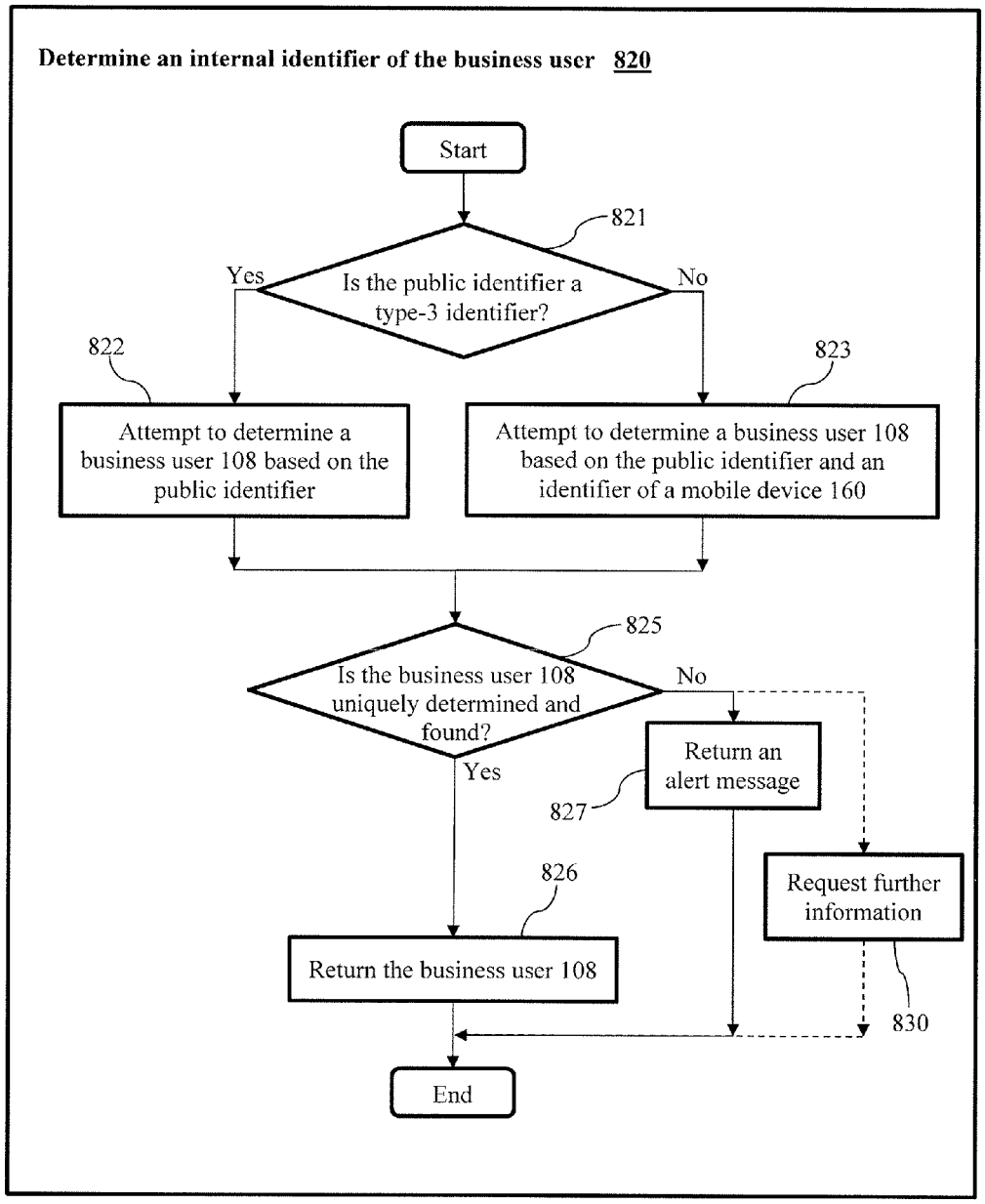
FIGS. 14-15 show conceptual flowcharts of various examples of FIG. 10, according to aspects of this disclosure.

FIG. 14 shows an example of the method 800 of FIG. 13. Turning to FIG. 14, an example process of step 820 of the method 800 is further articulated, i.e., the business user 108 may be identified based on the public identifier or the public identifier and an identifier of the messaging device 160. In FIG. 14, whether the public identifier is a type-3 identifier may be assessed, at 821. The public identifier may be assessed by querying an SMS DB 130 (shown in FIG. 1).

If the public identifier is determined to be a type-3 identifier, an internal identifier of the business user 108 may be determined based on the public identifier, at 822. If the public identifier is determined not to be a type-3 identifier, the internal identifier of the business user 108 may be determined based on the public identifier and the identifier of the messaging device 160, at 823. In either cases, the internal identifier of the business user 108 may be determined by querying the SMS DB 130.

At 825, whether the business user 108 is found in the SMS DB 130 may be assessed. If the business user 108 is uniquely determined and found, the internal identifier of the business user 108 may be returned, at 826. The identifier may be used in routing and delivering a reply message sent by the messaging device 160 to the business user 108. If the intended business user 108 cannot be determined or cannot be found, at 825, an alert message may be returned, at 827, to a user of the messaging device 160. The alert message may say, e.g., "could not determine intended recipient". Alternatively and/or additionally, further information may be requested, at 830, for determining the intended business user 108. Additional detail regarding the requesting the further information will be provided with reference to FIG. 15.

Figure 15:
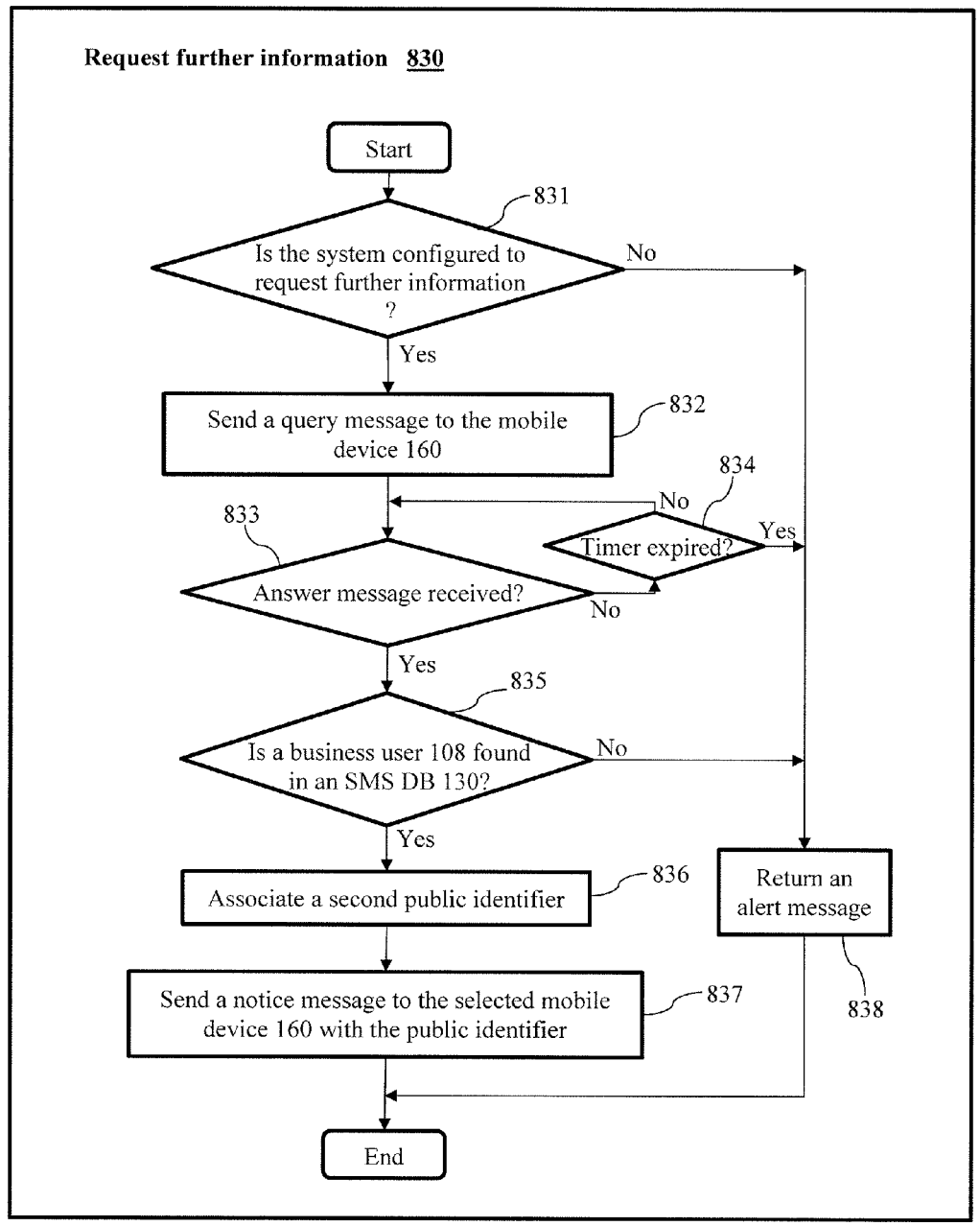

FIG. 15 shows an example of the sub-process of method 800 of FIG. 14. Turning to FIG. 15, an example process of step 830 of the method 800 is further articulated, i.e., further information may be requested for determining an intended business user 108 when the intended business user 108 may not be determined by the sub-process of FIG. 14. The further information may be requested from the messaging device 160, e.g., by a business server 110 (shown in FIG. 1). At 831, whether a business messaging system 100 (shown in FIG. 1) is configured to request further information when the intended business user 108 is not found may be assessed, at 831. If the business messaging system 100 is not configured to request further information, an alert message may be returned, at 838, to a user of the messaging device 160. The alert message may say, e.g., "We cannot deliver your message to the intended recipient". Such configuration may provide a security that prevents an unknown user of the messaging device 160 from sending unsolicited messages to the business users 108.

If the business messaging system 100 is configured to request further information, a query message may be sent back to the messaging device 160, at 832, for more information about the business user 108 for whom the reply message is intended. For example, if the public identifier is "111-111-1111", the alert message may say "Your message to 111-111-1111 cannot be delivered; please provide the user ID of the intended recipient for your message."

An answer in response to the query message is expected, at 833. If the answer is received from the messaging device 160, the SMS DB 130 may be further queried for the intended business user 108 based on a content of the answer. For example, if an internal identifier is provided by the messaging device 160 within a predetermined time window, the internal identifier may be verified via querying the SMS DB 130. If no business user 108 that matches the internal identifier can be found in the SMS DB 130, or if no answer is received in response to the query message after a predetermined duration, the sub-process may be terminated. An alert message may be returned to the messaging device 160, at 838. The alert message may say, e.g., "System: message was not delivered."

Alternatively and/or additionally, if no answer is received in response to the query message after a predetermined duration, another query message may be sent to the messaging device 160 (not shown). In such a case, the alert message, e.g., "System: message is not delivered", may be delivered to the messaging device 160 after a predetermined number of query messages.

If a business user 108 is found from the SMS DB 130, at 835, based on the answer, a second public identifier may be associated with the intended business user 108 and the identifier of the messaging device 160. A notice message may be sent to the messaging device 160, at 837, with the associated second public identifier. For example, if the second public identifier is "222-222-2222", the notice message may say "System: please use '222-222-2222' as recipient user ID for sending future messages." The associated second public identifier may be used by the messaging device 160 to exchange further messages with the business user 108.

Figure 16:
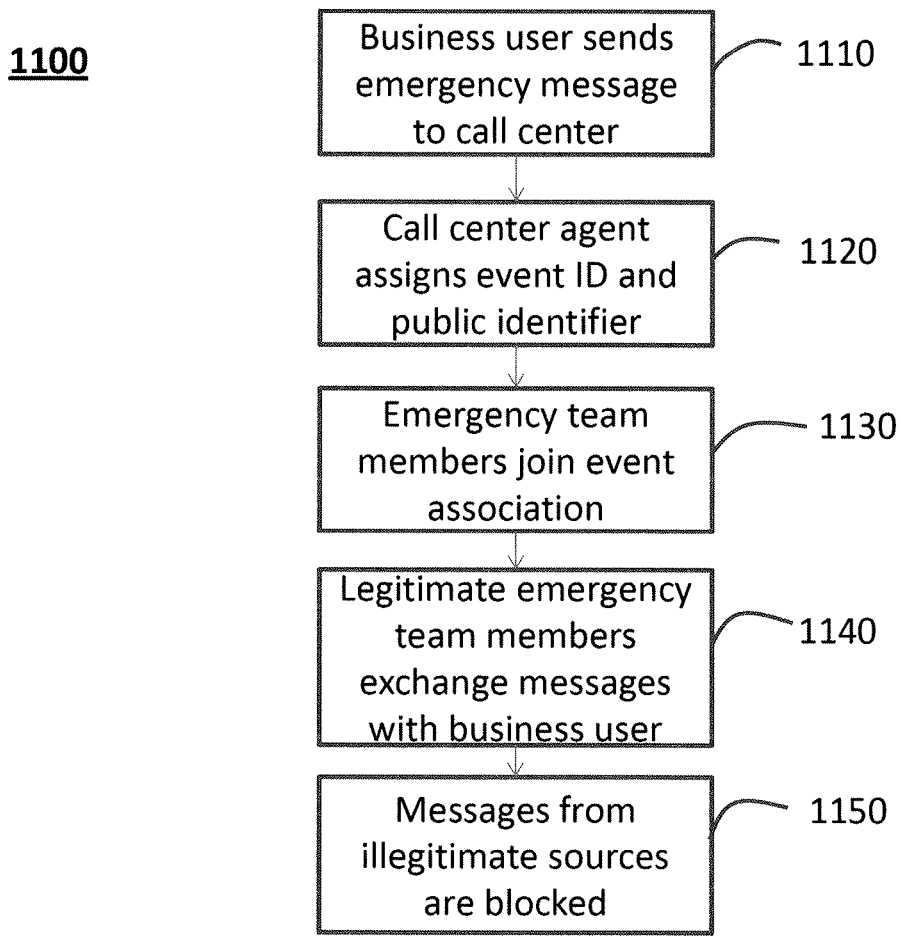
FIGS. 16-19 show conceptual flowcharts of various example processes according to various aspects of this disclosure.

FIG. 16, shows a further messaging process 1100 that may be used in, for example, emergency situations. A business user 108 (for example, but not limited to, a lost hiker) may send a specific message to a call center 170, as shown in FIG. 20, such as an emergency message to a search and rescue (SaR) call center asking for help. An agent of the, e.g., emergency call center 170 may receive the message from the business user and may establish an event 1120, including associating a temporary public identifier (e.g., telephone number) with the business user 108, which may create a type-4 association. The agent may also establish an event ID and associate it with the association of the temporary public identifier, such as causing the business server to establish an entry in the appropriate association table of SMS DB 130 (included in "Databases" 130 in FIG. 20). Once the association has been established, one or more mobile users 160A, 160B (e.g., one or more SaR team members) may be associated with the event 1130 and may be considered to be legitimate members who may send unsolicited messages to the business user 108 (e.g., the hiker) 1140. If unauthorized mobile users (who may have obtained the temporary public identifier in some other way) attempt to send unsolicited messages to the business user, their messages may be blocked 1150.

Figure 17:
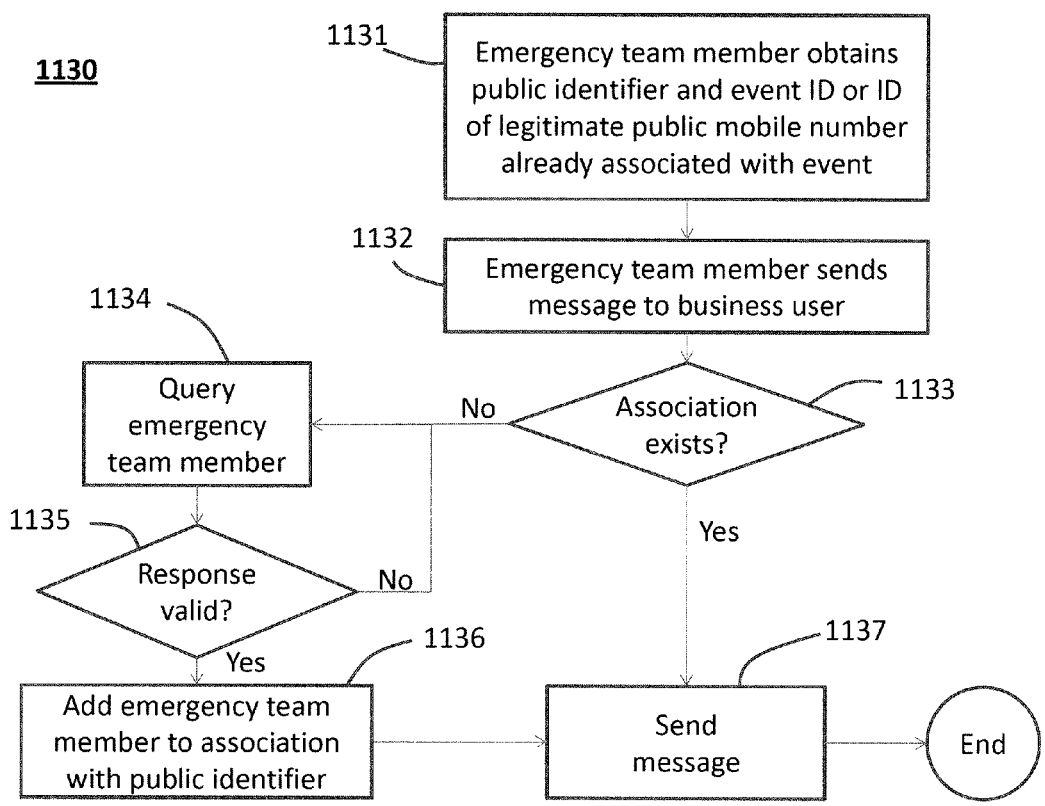

FIG. 17 provides a detailed illustration of an example of sub-process 1130 of process 1100, according to various aspects of this disclosure. It is noted that, as discussed above, a basic type-4 association is the "promiscuous use case," in which any user who has obtained the type-4 public identifier for the association may provide it to any other user, and there is association to the further user, without further authentication/verification; this may correspond to the case in FIG. 17 in which blocks 1133-1136 (discussed below) are skipped. FIG. 17, when blocks 1133-1136, addresses other cases. In FIG. 17, a mobile user (such as a SaR team member) 160A, 160B may obtain the temporary public identifier 1131 from another mobile device user 160A, 160B or from the agent of the emergency call center 170. According to some variations of this process, the mobile user 160A, 160B may obtain one or more additional pieces of information, such as the mobile number of another legitimate mobile user 160A, 160B from whom he obtained the temporary public identifier, the event ID, a password, or other required ID. The mobile user 160A, 160B may attempt to send a message using the temporary public identifier 1132. The business server 110 may determine that the message was sent using a temporary public identifier (of a type-4 association) and may determine 1133 based on the association tables in databases 130 whether the public number of the mobile device 160A, 160B is associated with the temporary public identifier. If it is determined that the association exists, the business server determines the internal ID of the intended business user 108 and forwards 1137 the unsolicited message from the mobile user 160A, 160B to the business user 108. It should be noted that in accordance with one variation, in addition to forwarding the message to the business user 108, the message may be forwarded to the subset of mobile users 160A, 160B who are associated with this specific temporary public identifier. However, if it is determined in 1133 that the mobile user 160A, 160B has not been associated with the temporary public identifier, the business server 110 may send 1134 a query message to the mobile user 160A, 160B, such as "please enter the event ID you would like to join", "please enter the event password", "please enter the ID of the user from whom you obtained this number", or other similar identification queries. The reply of the mobile user may be obtained and validated 1135. If the information is not valid, the system may present the mobile user 160A, 160B another query and allow him to provide an answer 1134. A counter (not shown) may count the number of attempts, and if the user fails to provide proper input after a predetermined number of attempts, the message may dropped and the mobile user 160A, 160B may be blocked from further attempts to associate itself with this event. If the mobile user 160A, 160B provides proper reply, the public number of the mobile user may be added to the association 1136, and the message may be forwarded to the business user 108 at step 1137. Similarly to above, in some variations, the message may be forwarded to all other mobile users 160A, 160B associated with the temporary public identifier.

In accordance with yet another aspect of this disclosure, after the association is first established, the business server 110 may save the entire message exchange related to the association (i.e., all messages sent by all associated users as part of the event). As a new user 160A, 160B joins the association 1136, the business server 110 may forward all of messages that were previously sent as part of the event to the new mobile user 160A, 160B. This may improve efficiency of the process in that the new mobile user 160A, 160B may not need to consume limited resources (such as expensive satellite time) in order to get updated about the status of the event.

Figure 18:
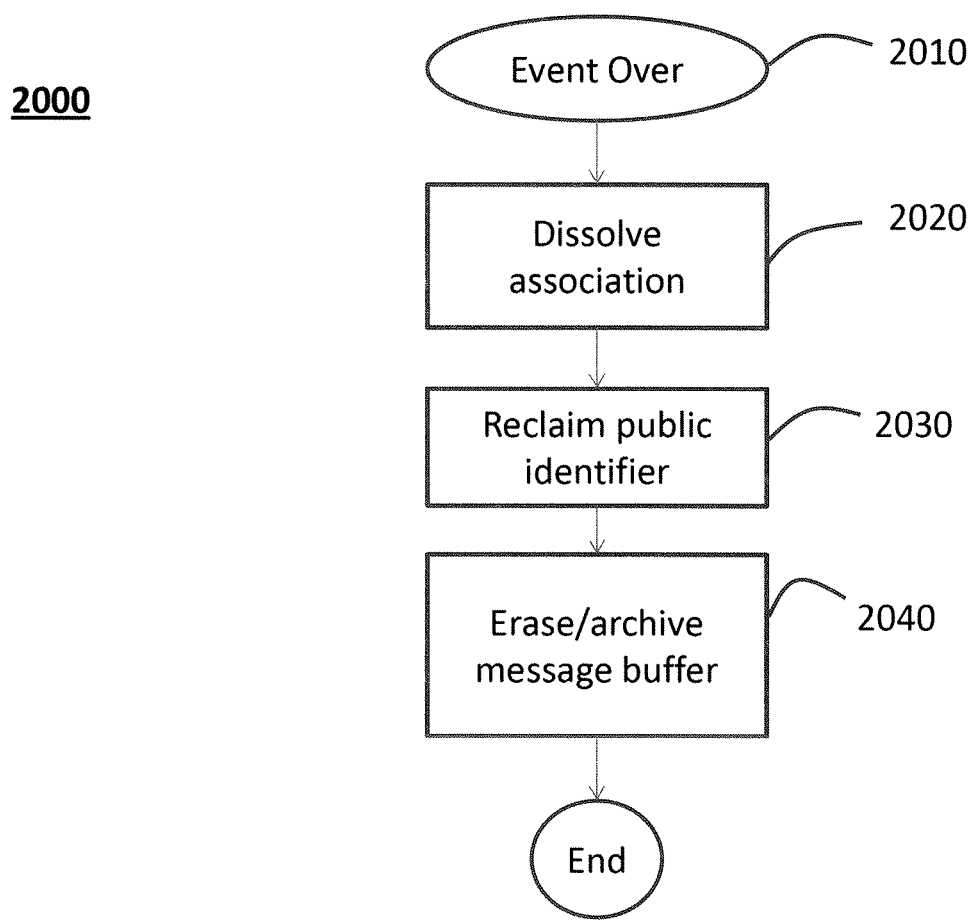

FIG. 18 illustrates a process 2000 that may occur at the end of an event. The end of an event may be detected 2010. The associations related to the said event may be dissolved 2020. Specifically, the related entries in the databases 130 may be deleted. The temporary public identifier may be reclaimed 2030 and added to the list of available temporary public identifiers of business server 110. Finally, the buffer that held the message exchange of this event may be archived for future reference 2040, and the buffer may be cleared in preparation for future events.

Figure 19:
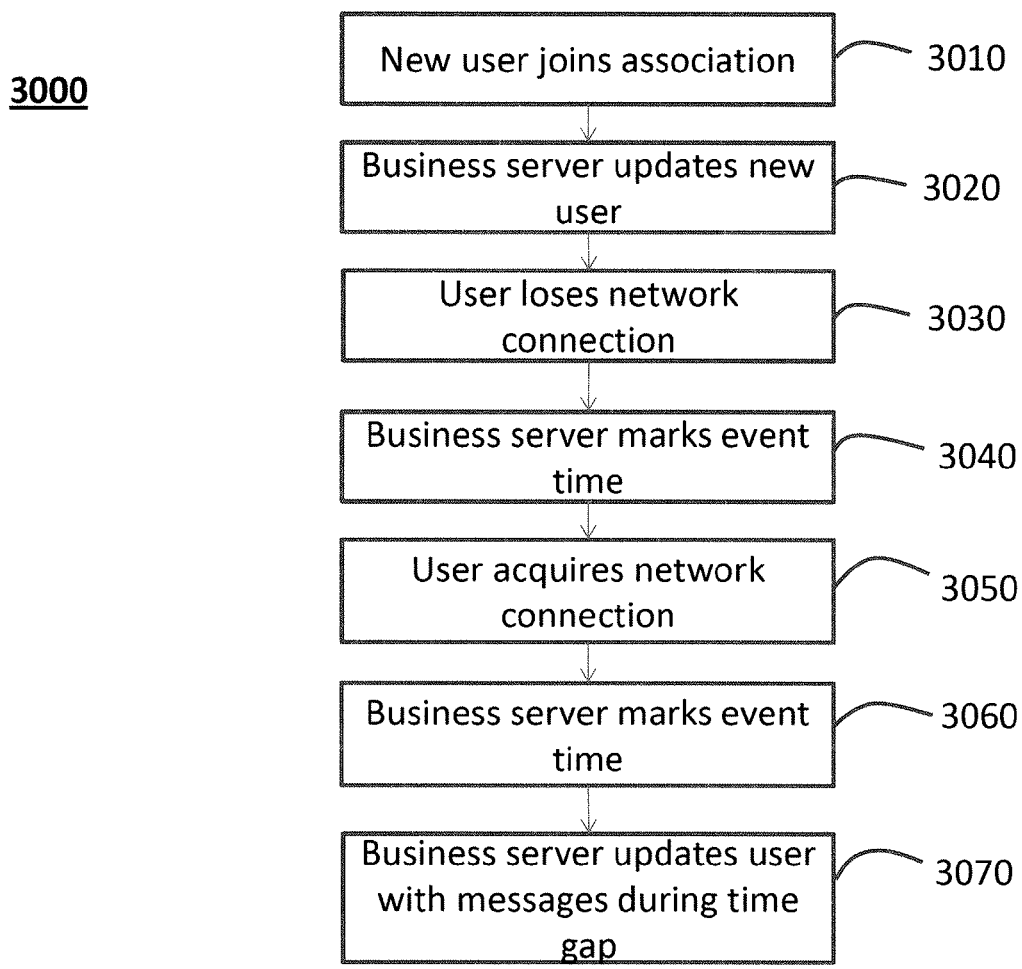

FIG. 19 illustrates a process 3000 in which a user may join an event and/or may lose and then reacquire connectivity during the event. For example, in the latter case, a mobile user 160A, 160B may initially be connected via a cellular or WiFi network and may subsequently lose network connectivity and may then reconnect via the same or other connectivity means (e.g., but not limited to, satellite connectivity). As noted above, a new user may join a type-4 association 3010 using a process described in detail in conjunction with FIG. 17. In this case, the new user may generally be a mobile user 160A, 160B. As the mobile user 160A, 160B joins the association, at block 3020, the business server 110 may send to the mobile user 160A, 160B the history of communication (if any) with the business user 108.

The remaining aspects of process 3000 may relate to the business user 108, a mobile user 160A, 160B, or even to an agent of the call center 170; in the present discussion, these will be generically referred to as "associated user." An associated user may lose network connectivity 3030. For example, a mobile user 160A, 160B, initially connected to a cellular or WiFi network, may venture to a location where cellular or WiFi connectivity is not available. The business server 110 may note that the associated user has lost network connectivity and may mark the timing of this occurrence 3040. The associated user may then reacquire connectivity, via the network previously used or using a new network 3050. For example, the mobile user 160A, 160B who lost cellular and/or WiFi connectivity may acquire satellite connectivity; in one example, this mobile user 160A, 160B acquiring satellite connectivity may acquire this satellite connectivity through the system associated with business server 110 and may become a business user using business server 110, but the invention is not thus limited. The business server 110 may detect and record the timing of this connectivity reacquisition event 3060; this may be done by means of a message transmitted by the associated user after reacquisition or merely by acquiring the network (Wi-Fi, cellular, satellite, etc., indicating that the associated user is again able to communicate. Business server 110 may then update the associated user who has reacquired connectivity 3070 by forwarding to that associated user messages associated with the event and sent during the time period between the times when connectivity loss was detected and connectivity reacquisition was detected.

While the non-limiting example discussed in the above paragraphs dealt with loss and reacquisition of network connectivity by a mobile user 160A, 160B, as noted above, in a further non-limiting example, a similar update process may occur when the business user 108 loses satellite connectivity and then reacquires connectivity, either via satellite or via other means. According to one aspect of this, the mobile messaging application of business user 108 may operate in a mode in which each message from the satellite is acknowledged by the mobile application. Accordingly, the business server 110 may keep a log of the messages that were acknowledged by each business user 108 and belonging to the given type-4 association. The system may keep track of the messages that each business user 108 has not acknowledged, and upon the business user 108 reacquiring connectivity, the system may forward all of unacknowledged messages to the user over an appropriate network, through which the business user 108 has now reacquired connectivity.

It should be noted that while the preceding temporary, event-based type-4 association and operations were described as related to establishing a temporary association between business users and mobile users, those skilled in the art would recognize that users' statuses may change between being business users and mobile users. For example, when an associated user is in a location where a mobile network, such as cellular or WiFi is available, the system may elect to automatically use this connectivity for sending and/or receiving messages to/from that associated user. As such the associated user may be considered to be a mobile user. However, as the user ventures to a location where cellular or WiFi network connectivity is not available, the messaging application may automatically switch to using satellite communication for connectivity. As the device of the associated user identifies that cellular or WiFi connectivity, for example, is not available (lost) and satellite connectivity has been acquired, the business server may treat the associated user as a business user (assuming that the satellite connectivity is via the system of the business server; if the associated user were to reacquire connectivity via a different satellite-based communication system, the associated user would still be treated as a mobile user, for the purposes of the association). It is thus possible to have more than one business user associated with zero, one or numerous mobile users, who may all be associated with the same temporary public identifier in the type-4 association.

Although the aspects of this disclosure presented above shown and described an SMS messaging system for purpose of illustration, those skilled in the art would recognize that the invention may extend to other messaging systems, including, but not limited to, other text, voice video messaging systems, and any business/enterprise communication systems. Additionally, those skilled in the art would recognize that, for a purpose of this disclosure, "text" and "SMS" are interchangeable without departing from the scope and spirit of the invention in its various aspects.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A system for exchanging messages between or among a business user and messaging devices during an event, comprising:

a business server configured to exchange messages with the business user and to obtain a temporary public identifier for the business user to enable duplex message exchange between or among the business user and one or more of the messaging devices during the event, wherein at least one of the messaging devices is enabled to obtain the temporary public identifier from another one of the messaging devices and to use the temporary public identifier to engage in message exchange with one or more of the business user or the one or more messaging devices during the event; and an application programming interface (API) communicatively coupled to the business server and configured to enable the invocation of a set of routines, protocols and/or tools designed to enable the business server to interact with one or more messaging systems that serve the one or more messaging devices;

wherein the business server is enabled to serve a number of business users using a number of public identifiers that is smaller than the number of business users.

2. The system of claim 1, wherein the business server is configured to obtain the temporary public identifier for the business user upon triggering of the event and to associate the temporary public identifier with the business user and the one or more messaging devices for the duration of the event.

3. The system of claim 1, wherein the business server is configured to provide a mechanism by which to determine whether or not a given messaging device using the temporary public identifier should be associated with the temporary public identifier, and if appropriate, to associate the given messaging device with the temporary public identifier, wherein the mechanism comprises a query and response mechanism, wherein the business server is configured to send a query to the given messaging device and to evaluate a response to the query to determine if the given messaging device should be associated with the temporary public identifier, and wherein the query is selected from the group consisting of an identification of a source from which the given messaging device obtained the temporary public identifier; an identification of the event; an identifier of the business user or a messaging device that is already associated with the temporary public identifier; and a password.

4. The system of claim 1, further comprising a message buffer communicatively coupled to the business server, wherein the business server is configured to store messages associated with the event in the message buffer.

5. The system of claim 4, wherein the business server is configured to provide the messages associated with the event and stored in the message buffer to a new user that becomes associated with the event.

6. The system of claim 4, wherein the business server is configured to determine an interval during which a given user associated with the event loses communication connectivity and reacquires communication connectivity and to provide to the given user messages associated with the event during the interval, wherein, for the business user, the business server is configured to maintain a record of messages not yet acknowledged by the business user, wherein the messages not yet acknowledged are determined to correspond to the interval.

7. A method for a business server to facilitate exchange of messages between or among a business user and messaging devices during an event, the method comprising:

obtaining a temporary public identifier for use during the event to enable duplex message exchange between or among the business user and one or more of the messaging devices during the event;

associating the business user with the temporary public identifier; and associating the one or more of the messaging devices with the temporary public identifier;

wherein at least one of the messaging devices is permitted to obtain the temporary public identifier from another one of the messaging devices and to use the temporary public identifier to become associated with the temporary public identifier; and wherein the business server is configured to serve a number of business users using a number of public identifiers that is less than the number of business users.

8. The method of claim 7, wherein the obtaining the temporary public identifier includes obtaining the temporary public identifier for the business user upon triggering of the event, and wherein the method further comprises associating the temporary public identifier with the business user and the one or more messaging devices for the duration of the event.

9. The method of claim 8, further comprising:
dissolving the associations after completion of the event; and
reclaiming the temporary public identifier.

10. The method of claim 7, further comprising associating the at least one of the messaging devices with the temporary public identifier without an authentication or verification process.

11. The method of claim 7, further comprising determining whether or not a given messaging device using the temporary public identifier should be associated with the temporary public identifier, and if appropriate, associating the given messaging device with the temporary public identifier, wherein the determining whether or not the given messaging device should be associated with the temporary public identifier includes:

sending a query to the given messaging device in response to an attempt by the given messaging device to use the temporary public identifier;

receiving a response to the query from the given messaging device; and evaluating the response to the query to determine if the given messaging device should be associated with the temporary public identifier, wherein the query is selected from the group consisting of an identification of a source from which the given messaging device obtained the temporary public identifier; an identification of the event; an identifier of the business user or a messaging device that is already associated with the temporary public identifier; and a password.

12. The method of claim 7, further comprising storing messages associated with the event in a message buffer.

13. The method of claim 12, further comprising providing messages stored in the message buffer to a user becoming newly associated with the temporary public identifier.

14. The method of claim 12, further comprising:
determining an interval during which a given user associated with the event loses communication connectivity and reacquires communication connectivity; and
providing to the given user messages associated with the event during the interval,
wherein, for the business user, the determining the interval includes maintaining a record of messages not yet acknowledged by the business user, wherein the messages not yet acknowledged are determined to correspond to the interval.

15. A non-transitory computer storage medium of a business server including at least one program containing executable instructions designed to implement operations, comprising:

obtaining a temporary public identifier for use during the event to enable duplex message exchange between or among the business user and one or more of the messaging devices during the event;

associating the business user with the temporary public identifier; and associating the one or more of the messaging devices with the temporary public identifier;

wherein at least one of the messaging devices is permitted to obtain the temporary public identifier from another one of the messaging devices and to use the temporary public identifier to become associated with the temporary public identifier; and wherein the business server is configured to serve a number of business users using a number of public identifiers that is less than the number of business users.

16. The medium of claim 15, wherein the obtaining the temporary public identifier includes obtaining the temporary public identifier for the business user upon triggering of the event, and wherein the operations further comprise associating the temporary public identifier with the business user and the one or more messaging devices for the duration of the event.

17. The medium of claim 16, wherein the operations further comprise:

dissolving the associations after completion of the event; and reclaiming the temporary public identifier.

18. The method of claim 15, further comprising associating the at least one of the messaging devices with the temporary public identifier without an authentication or verification process.

19. The medium of claim 15, wherein the operations further comprise determining whether or not a given messaging device using the temporary public identifier should be associated with the temporary public identifier, and if appropriate, associating the given messaging device with the temporary public identifier, wherein the determining whether or not the given messaging device should be associated with the temporary public identifier includes:

sending a query to the given messaging device in response to an attempt by the given messaging device to use the temporary public identifier;

receiving a response to the query from the given messaging device; and evaluating the response to the query to determine if the given messaging device should be associated with the temporary public identifier, and wherein the query is selected from the group consisting of an identification of a source from which the given messaging device obtained the temporary public identifier; an identification of the event; an identifier of the business user or a messaging device that is already associated with the temporary public identifier; and a password.

20. The medium of claim 15, wherein the operations further comprise storing messages associated with the event in a message buffer.

21. The medium of claim 20, wherein the operations further comprise providing messages stored in the message buffer to a user becoming newly associated with the temporary public identifier.

22. The medium of claim 20, wherein the operations further comprise:

determining an interval during which a given user associated with the event loses communication connectivity and reacquires communication connectivity; and providing to the given user messages associated with the event during the interval, wherein, for the business user, the determining the interval includes maintaining a record of messages not yet acknowledged by the business user, wherein the messages not yet acknowledged are determined to correspond to the interval.

* * * * *